US012609466B2

(12) United States Patent
Huang et al.

(10) Patent No.: US 12,609,466 B2
(45) Date of Patent: Apr. 21, 2026

(54) CONDUCTIVE TERMINAL AND ELECTRICAL CONNECTOR HAVING THE SAME

(71) Applicant: LOTES CO., LTD, Keelung (TW)

(72) Inventors: Chang Wei Huang, Keelung (TW); Yao Ling Cheng, Keelung (TW)

(73) Assignee: LOTES CO., LTD., Keelung (TW)

( * ) Notice: Subject to any disclaimer, the term of this patent is extended or adjusted under 35 U.S.C. 154(b) by 315 days.

(21) Appl. No.: 18/228,038

(22) Filed: Jul. 31, 2023

(65) Prior Publication Data

US 2024/0047904 A1 Feb. 8, 2024

(30) Foreign Application Priority Data

Aug. 3, 2022 (CN) ........................ 202222035487.X
Jun. 16, 2023 (CN) ........................ 202321561917.X

(51) Int. Cl.

| | |
|---|---|
| ***H01R 12/58*** | (2011.01) |
| ***H01R 4/02*** | (2006.01) |
| ***H01R 12/57*** | (2011.01) |
| ***H01R 13/24*** | (2006.01) |
| ***H01R 13/6473*** | (2011.01) |

(52) U.S. Cl.

CPC ............. *H01R 12/585* (2013.01); *H01R 4/02* (2013.01); *H01R 12/57* (2013.01); *H01R 13/2407* (2013.01); *H01R 13/6473* (2013.01)

(58) Field of Classification Search

CPC .... H01R 12/585; H01R 12/57; H01R 12/714; H01R 4/02; H01R 13/2407; H01R 13/6473; H01R 13/2435; H01R 13/24; H01R 13/2442; H01R 13/2457

See application file for complete search history.

(56) References Cited

U.S. PATENT DOCUMENTS

| | | | | |
|---|---|---|---|---|
| 10,424,858 B2 * | 9/2019 | Ju | .......................... | H01R 43/16 |
| 10,944,196 B2 * | 3/2021 | Ou | ...................... | H01R 13/2457 |
| 11,469,533 B2 * | 10/2022 | Ho | ...................... | H01R 13/2435 |
| 2018/0331441 A1 * | 11/2018 | Huang | ............... | H01R 13/6461 |
| 2024/0421517 A1 * | 12/2024 | Huang | ................... | H01R 12/55 |

FOREIGN PATENT DOCUMENTS

| | | |
|---|---|---|
| CN | 111029814 A | 4/2020 |
| CN | 218525769 U | 2/2023 |

* cited by examiner

*Primary Examiner* — Renee S Luebke
*Assistant Examiner* — Paul D Baillargeon
(74) *Attorney, Agent, or Firm* — Troutman Pepper Locke LLP; Tim Tingkang Xia, Esq.

(57) ABSTRACT

A conductive terminal and an electrical connector having the same are provided. The conductive terminal includes a base portion, an elastic arm formed by extending upward from an upper end of the base portion, and a conductive portion located below the base portion. The elastic arm includes a contact arm and a first arm and a second arm provided at an interval in a left-right direction. The first arm and the second arm are both located between the contact arm and the base portion. The contact arm has a contact portion. A maximum width of the second arm in the left-right direction is greater than a maximum width of the first arm in the left-right direction. A central line of the contact portion and a connecting location of the second arm and the base portion are located at left and right sides of a central line of the base portion.

17 Claims, 16 Drawing Sheets

100

A-A

CONDUCTIVE TERMINAL AND ELECTRICAL CONNECTOR HAVING THE SAME

CROSS-REFERENCE TO RELATED PATENT APPLICATION

This non-provisional application claims priority to and the benefit of, pursuant to 35 U.S.C. § 119(a), patent application Serial No. CN202222035487.X filed in China on Aug. 3, 2022, and patent application Serial No. CN202321561917.X filed in China on Jun. 16, 2023. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a conductive terminal and an electrical connector having the same, and particularly to a conductive terminal improving high frequency and an electrical connector having the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing electrical connector includes an insulating body and a plurality of conductive terminals provided in the insulating body. Each conductive terminal has a base portion and an elastic arm formed by extending upward from an upper end of the base portion. The elastic arm includes a contact arm, a first arm and a second arm provided in a left-right direction at an interval, and a through slot formed between the first arm and the second arm. The first arm and the second arm are located between the contact arm and the base portion. The contact arm has a contact portion, and a central line of the contact portion in the left-right direction and a central line of the base portion in the left-right direction are collinear. A whole width of the first arm is greater than a width of the second arm. A shortest conductive path of the conductive terminal from the contact portion through the first arm is shorter than a shortest conductive path from the contact portion through the second arm.

By increasing the width of the first arm, the electrical connector reduces the overall impedance of the conductive terminal and improves the high frequency characteristics thereof. However, for the first arm and the second arm only, the width of the first arm is changed such that the impedances of it and the second arm do not match.

Further, with the customers having higher requirements to the high frequency characteristics of the electrical connector, and some customers' pursuit of the electrical connector being more personalized and diversified, the structure of most of the electrical connectors and the conductive terminals on the market can no longer meet the individual needs of some customers. For some customers, in order to create an electronic product that is different from others to improve the market competitiveness, the structure of the electrical connector is changed by changing the location of the contact portion in the conductive terminal in order to adapt to the electronic product.

Therefore, a heretofore unaddressed need to design a novel conductive terminal and an electrical connector having the same exists in the art to address the aforementioned deficiencies and inadequacies.

SUMMARY

To solve the deficiencies of the related art, the present invention is directed to a novel conductive terminal and an electrical connector having the same, in which the central line of the contact portion is deviated toward a side opposite to the second arm in the left-right direction relative to the central line of the base portion, thus widening a width of the conductive path of the second arm, adjusting the impedance of the second arm, and enhancing the impedance matching of the second arm and the first arm.

To achieve the foregoing objective, the present invention provides a conductive terminal, which includes: a base portion; and an elastic arm formed by extending upward from an upper end of the base portion. The elastic arm includes a contact arm, a first arm and a second arm provided at an interval in a left-right direction, and a through slot formed between the first arm and the second arm, the first arm and the second arm are both located between the contact arm and the base portion, the contact arm has a contact portion, a maximum width of the second arm in the left-right direction is greater than a maximum width of the first arm in the left-right direction, and a central line of the contact portion in the left-right direction and a connecting location of the second arm and the base portion are located at a left side and a right side of a central line of the base portion in the left-right direction.

In certain embodiments, a length of a conductive path from the contact portion through the first arm to a connecting location of the first arm and the base portion is shorter than a length of a conductive path from the contact portion through the second arm to the connecting location of the second arm and the base portion.

In certain embodiments, the base portion is a flat plate structure, the through slot extends to the base portion, the first arm and the second arm are connected to the base portion, and a width of the connecting location of the second arm and the base portion in the left-right direction is greater than a width of a connecting location of the first arm and the base portion in the left-right direction.

In certain embodiments, the conductive terminal has a conductive portion and a connecting arm, the conductive portion is located below the base portion, the connecting arm is connected to the conductive portion and the base portion, and a central line of the conductive portion in the left-right direction and the central line of the contact portion in the left-right direction are located at a same side of the central line of the base portion in the left-right direction.

In certain embodiments, the first arm and the second arm are connected to the base portion, and a length of a shortest conductive path from the contact portion to the conductive portion through the second arm is longer than a length of a shortest conductive path from the contact portion to the conductive portion through the first arm.

In certain embodiments, the base portion is a flat plate structure, the through slot extends to the upper end of the base portion, and a width of a connecting location of the first arm and the contact arm in the left-right direction is equal to a width of the connecting location of the second arm and the contact arm in the left-right direction.

In certain embodiments, the conductive terminal has a conductive portion, a connecting arm and a through hole running through the base portion, the conductive portion functions as a soldering portion and is located below the base portion, the connecting arm is connected to the conductive portion and the base portion, the through hole comprises a wide portion and a narrow portion, the wide portion is located below the narrow portion and is in communication with the narrow portion, the base portion has a first protruding bump formed by protruding upward relative to a bottom portion of the wide portion, and the connecting arm is connected to the base portion correspondingly below the first protruding bump.

In certain embodiments, the base portion further has a second protruding bump and two first curve surfaces formed on a top portion of the narrow portion, the second protruding bump is formed by protruding downward from the top portion of the narrow portion, each of the first curve surfaces arches upward, the second protruding bump has a second curve surface arching downward, and the two first curve surfaces are respectively located at a left side and a right side of the second protruding bump and are connected to the second curve surface.

In certain embodiments, the base portion further has a second protruding bump, the second protruding bump protrudes downward relative to the top portion of the narrow portion, the first protruding bump is located below the second protruding bump and is spaced apart from the second protruding bump, and the central line of the contact portion in the left-right direction passes through the first protruding bump and the second protruding bump in a vertical direction.

In certain embodiments, the base portion has two first branches and two second branches, the two second branches are connected to each other, the two first branches are formed at a left side and a right side of the narrow portion, the two second branches are provided corresponding to the wide portion, each of the two second branches is connected to one of the two first branches, a size of each of the second branches located at a left side and a right side of the wide portion in the left-right direction is not greater than one half of a size of each of the first branches in the left-right direction, and a size of the second branch located below the wide portion in a vertical direction is not greater than one half of a size of each of the first branches in the left-right direction.

In certain embodiments, the conductive terminal has a through hole running through the base portion, the through hole comprises a wide portion and a narrow portion, the wide portion is located below the narrow portion and is in communication with the narrow portion, the conductive terminal is provided with at least two protrusions at the left side and the right side of the base portion, the protrusions are formed by protruding toward a side away from the through hole from the base portion in the left-right direction, the protrusions located at two sides of the narrow portion are defined as first protrusions, the protrusions located at two sides of the wide portion are defined as second protrusions, and the first protrusions are located above the second protrusions and are spaced apart from the second protrusions.

In certain embodiments, the conductive terminal has a through hole running through the base portion, the through hole comprises a wide portion and a narrow portion, the wide portion is located below the narrow portion and is in communication with the narrow portion, the base portion has two oblique surfaces formed on a top portion of the wide portion, and the two oblique surfaces are located at a left side and a right side of the narrow portion and extend obliquely downward and toward each other.

In certain embodiments, the contact arm further comprises a widening portion connected to the contact portion, a minimum size of the widening portion in the left-right direction is greater than a maximum size of the contact portion in the left-right direction, at least portions of the first arm and the second arm extend obliquely upward to be closer to each other and are connected to the widening portion, the widening portion has two side surfaces provided opposite to each other along the left-right direction, and the two side surfaces are parallel to each other.

The present invention further provides an electrical connector, which includes: an insulating body, having an upper surface and a lower surface provided opposite to each other along a vertical direction; and a plurality of conductive terminals, provided in the insulating body, wherein each of the conductive terminals has a base portion and an elastic arm formed by extending upward from an upper end of the base portion. The elastic arm comprises a contact arm, a first arm and a second arm provided at an interval in a left-right direction, and a through slot formed between the first arm and the second arm, the first arm and the second arm are both located between the contact arm and the base portion, the contact arm has a contact portion, a maximum width of the second arm in the left-right direction is greater than a maximum width of the first arm in the left-right direction, and a central line of the contact portion in the left-right direction and a connecting location of the second arm and the base portion are located at a left side and a right side of a central line of the base portion in the left-right direction.

In certain embodiments, the conductive terminal has a conductive portion and a connecting arm, the conductive portion functions as a soldering portion and is located below the base portion, the connecting arm is connected to the conductive portion and the base portion, along the left-right direction, a central line of the conductive portion in the left-right direction and the central line of the contact portion in the left-right direction are located at a same side of the central line of the base portion in the left-right direction, the first arm and the second arm are connected to the base portion, and a length of a shortest conductive path from the contact portion to the conductive portion through the second arm is longer than a length of a shortest conductive path from the contact portion to the conductive portion through the first arm.

In certain embodiments, the base portion is a flat plate structure, the through slot extends to the base portion, the first arm and the second arm are connected to the base portion, and a width of a connecting location of the second arm and the base portion in the left-right direction is greater than a width of a connecting location of the first arm and the base portion in the left-right direction.

Compared with the related art, certain embodiments of the present invention have the following beneficial effects:

By providing the maximum width of the second arm in the left-right direction to be greater than the maximum width of the first arm in the left-right direction, the central line of the contact portion in the left-right direction and the connecting location of the second arm and the base portion are located at a left side and a right side of a central line of the base portion in the left-right direction. That is, in the left-right direction, the contact portion deviates toward a side opposite to the second arm relative to the base portion, thus widening the width of the conductive path of the second arm, which is conducive to adjusting the impedance of the second arm, and enhancing the impedance matching of the second arm and the first arm, which satisfies the high frequency characteristics of the conductive terminal and satisfies the customer's personalized requirements to the electrical connector.

To solve the deficiencies of the related art, the present invention is directed to a novel conductive terminal and an electrical connector having the same, in which the shortest conductive path from the contact portion to the conductive portion through the second arm is slightly longer than that through the first arm, thus widening a width of the conductive path of the second arm, which is conducive to adjusting the impedance of the second arm, and enhancing the impedance matching of the second arm and the first arm.

The present invention further provides a conductive terminal, which includes: a base portion; an elastic arm formed by extending upward from an upper end of the base portion; and a conductive portion located below the base portion. The elastic arm comprises a contact arm, a first arm and a second arm provided at an interval in a left-right direction, and a through slot formed between the first arm and the second arm, the first arm and the second arm are both located between the contact arm and the base portion, the contact arm has a contact portion, a maximum width of the second arm in the left-right direction is greater than a maximum width of the first arm in the left-right direction, and a length of a shortest conductive path from the contact portion to the conductive portion through the first arm is shorter than a length of a shortest conductive path from the contact portion to the conductive portion through the second arm.

In certain embodiments, a central line of the contact portion in the left-right direction and a connecting location of the second arm and the base portion are located at a left side and a right side of a central line of the base portion in the left-right direction.

In certain embodiments, the base portion is a flat plate structure, the through slot extends to the base portion, the first arm and the second arm are connected to the base portion, and a width of a connecting location of the second arm and the base portion in the left-right direction is greater than a width of a connecting location of the first arm and the base portion in the left-right direction.

In certain embodiments, the conductive terminal has a conductive portion and a connecting arm, the conductive portion functions as a soldering portion and is located below the base portion, the connecting arm is connected to the conductive portion and the base portion, and a central line of the conductive portion in the left-right direction and the central line of the contact portion in the left-right direction are located at a same side of the central line of the base portion in the left-right direction.

Compared with the related art, certain embodiments of the present invention have the following beneficial effects:

In the conductive terminal, the length of the shortest conductive path from the contact portion to the conductive portion through the first arm is shorter than the length of the shortest conductive path from the contact portion to the conductive portion through the second arm. By providing a greater width for the portion of the conductive terminal from the contact portion to the conductive portion having a longer conductive path, the maximum width of the second arm in the left-right direction is provided to be greater than the maximum width of the first arm in the left-right direction, such that a maximum cross-sectional area of the second arm is greater than a maximum cross-sectional area of the first arm, thus widening the conductive path of the second arm, enhancing the impedance matching of the second arm and the first arm, and balancing the impedances of the first arm and the second arm, thereby improving the high frequency characteristics of the conductive terminal.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
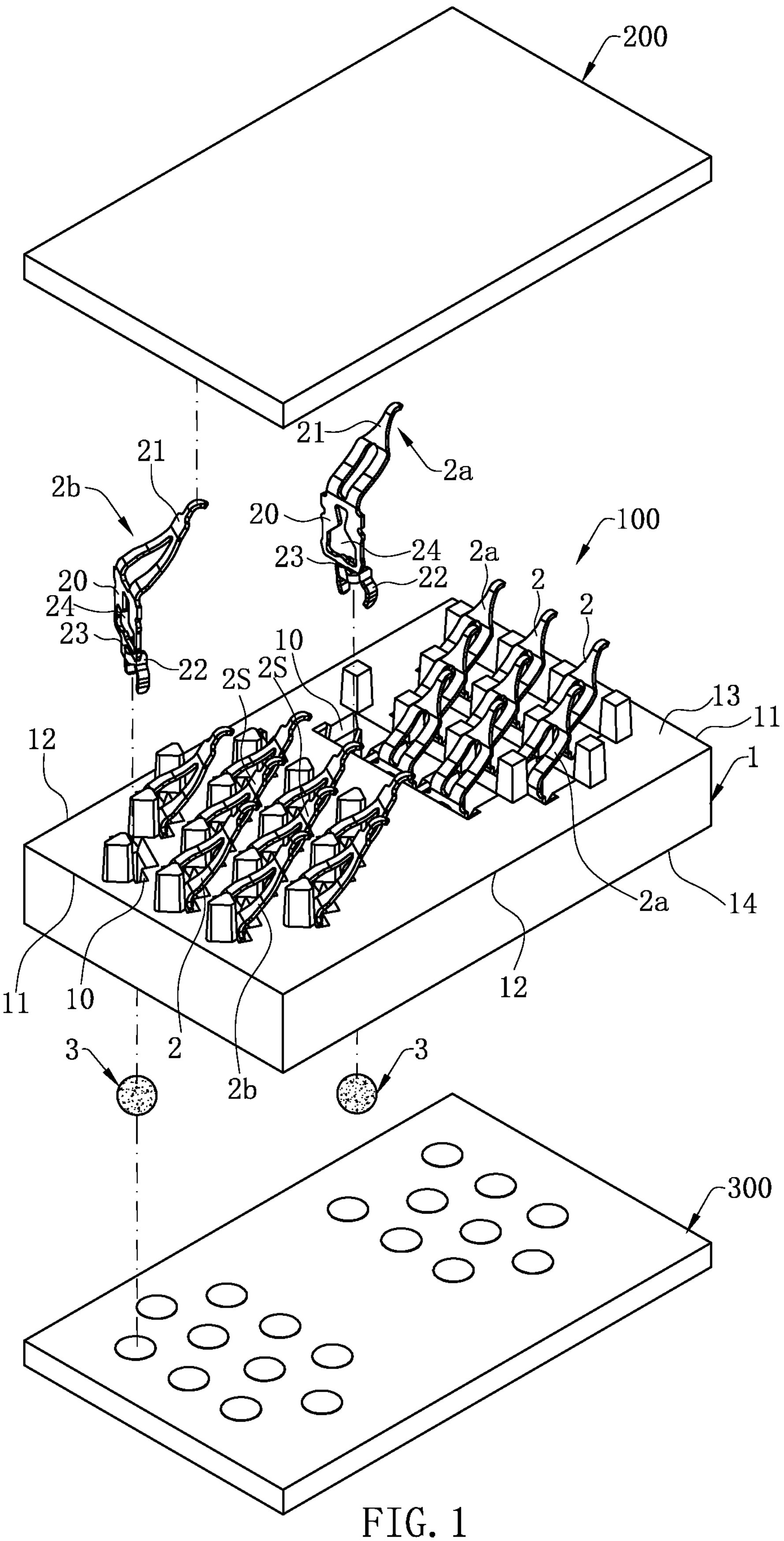
FIG. 1 is a perspective view of an electrical connector according to a first embodiment of the present invention not being conductively connected to a chip module and a circuit board.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of “a”, “an”, and “the” includes plural reference unless the context clearly dictates otherwise. Also, as used in the description herein and throughout the claims that follow, the meaning of “in” includes “in” and “on” unless the context clearly dictates otherwise. Moreover, titles or subtitles may be used in the specification for the convenience of a reader, which shall have no influence on the scope of the present invention.

It will be understood that when an element is referred to as being “on” another element, it can be directly on the other element or intervening elements may be present therebetween. In contrast, when an element is referred to as being “directly on” another element, there are no intervening elements present. As used herein, the term “and/or” includes any and all combinations of one or more of the associated listed items.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The exemplary term “lower”, can therefore, encompasses both an orientation of “lower” and “upper,” depending of the particular orientation of the figure. Similarly, if the device in one of the figures is turned over, elements described as “below” or “beneath” other elements would then be oriented “above” the other elements. The exemplary terms “below” or “beneath” can, therefore, encompass both an orientation of above and below.

As used herein, “around”, “about” or “approximately” shall generally mean within 20 percent, preferably within 10 percent, and more preferably within 5 percent of a given value or range. Numerical quantities given herein are approximate, meaning that the term “around”, “about” or “approximately” can be inferred if not expressly stated.

As used herein, the terms “comprising”, “including”, “carrying”, “having”, “containing”, “involving”, and the like are to be understood to be open-ended, i.e., to mean including but not limited to.

The description will be made as to the embodiments of the present invention in conjunction with the accompanying drawings in FIGS. 1-16. In accordance with the purposes of this invention, as embodied and broadly described herein, this invention, in one aspect, relates to a conductive terminal and an electrical connector having the same.

FIG. 1 to FIG. 10 show an electrical connector according to a first embodiment of the present invention, and FIG. 11 to FIG. 16 show an electrical connector according to a second embodiment of the present invention. In the two aforementioned embodiments, the electrical connector 100 is used to be pressed against a chip module 200 and is conductively connected to a circuit board 300. In other embodiments, the electrical connector 100 may be connected to other electrical components.

Figure 3:
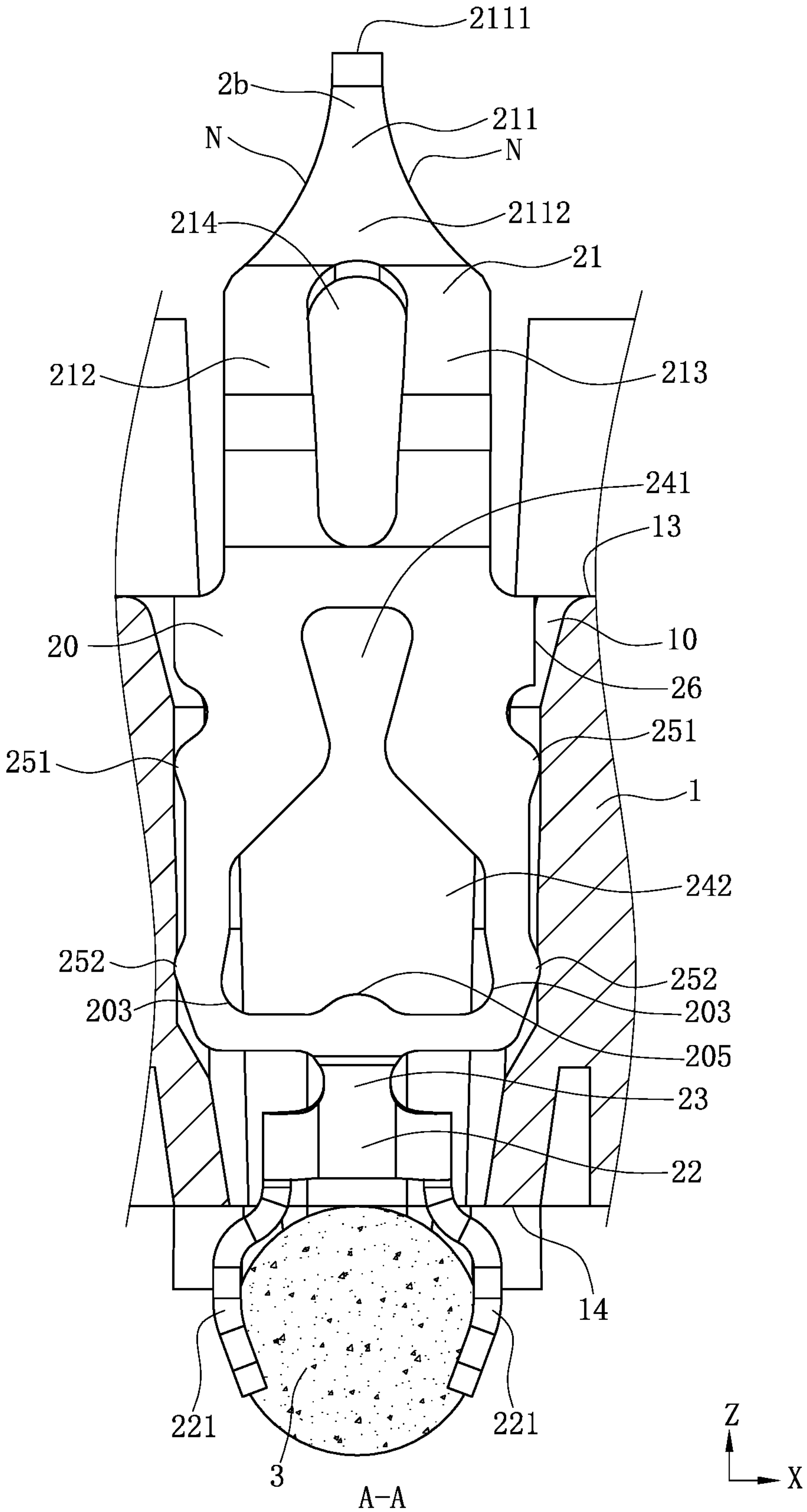
FIG. 3 is a partial sectional view of FIG. 2 sectioned along the A-A direction.
Figure 4:
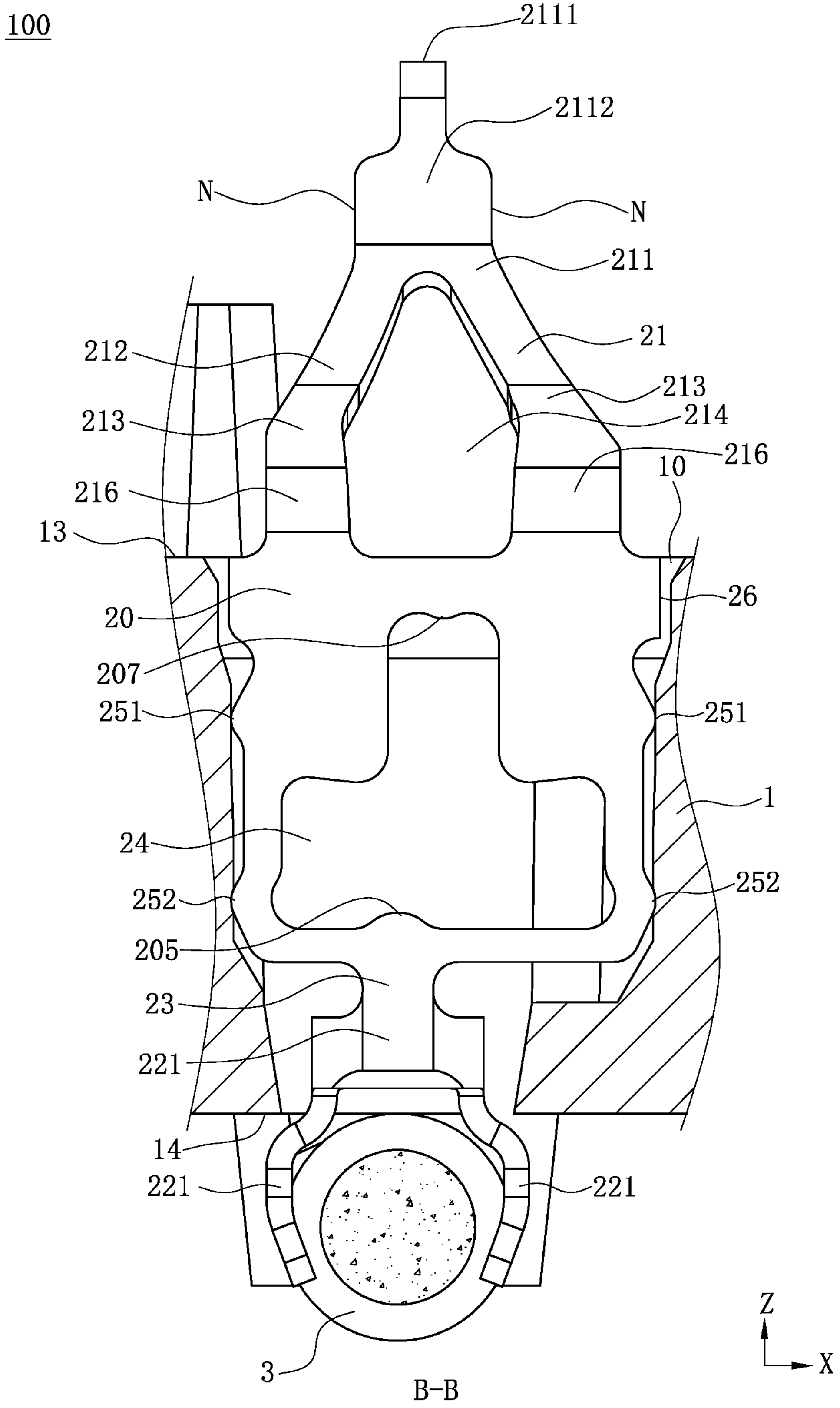
FIG. 4 is a partial sectional view of FIG. 2 sectioned along the B-B direction.

As shown in FIG. 1, FIG. 3 and FIG. 4, the electrical connector 100 includes an insulating body 1, a plurality of conductive terminals 2 provided in the insulating body 1 and a plurality of solder balls 3 conductively connected to the conductive terminals 2 correspondingly. The insulating body 1 is formed by a plastic material, and includes a plurality of terminal slots 10, two first side edges 11 provided opposite to each other, two second side edges 12 provided opposite to each other, and an upper surface 13 and a lower surface 14 provided opposite to each other along a vertical direction. Each terminal slot 10 runs through the upper surface 13 and the lower surface 14. The terminal slots 10 one-to-one correspondingly accommodate the conductive terminals 2. The first side edges 11 and the second side edges 12 are perpendicular to each other.

Figure 2:
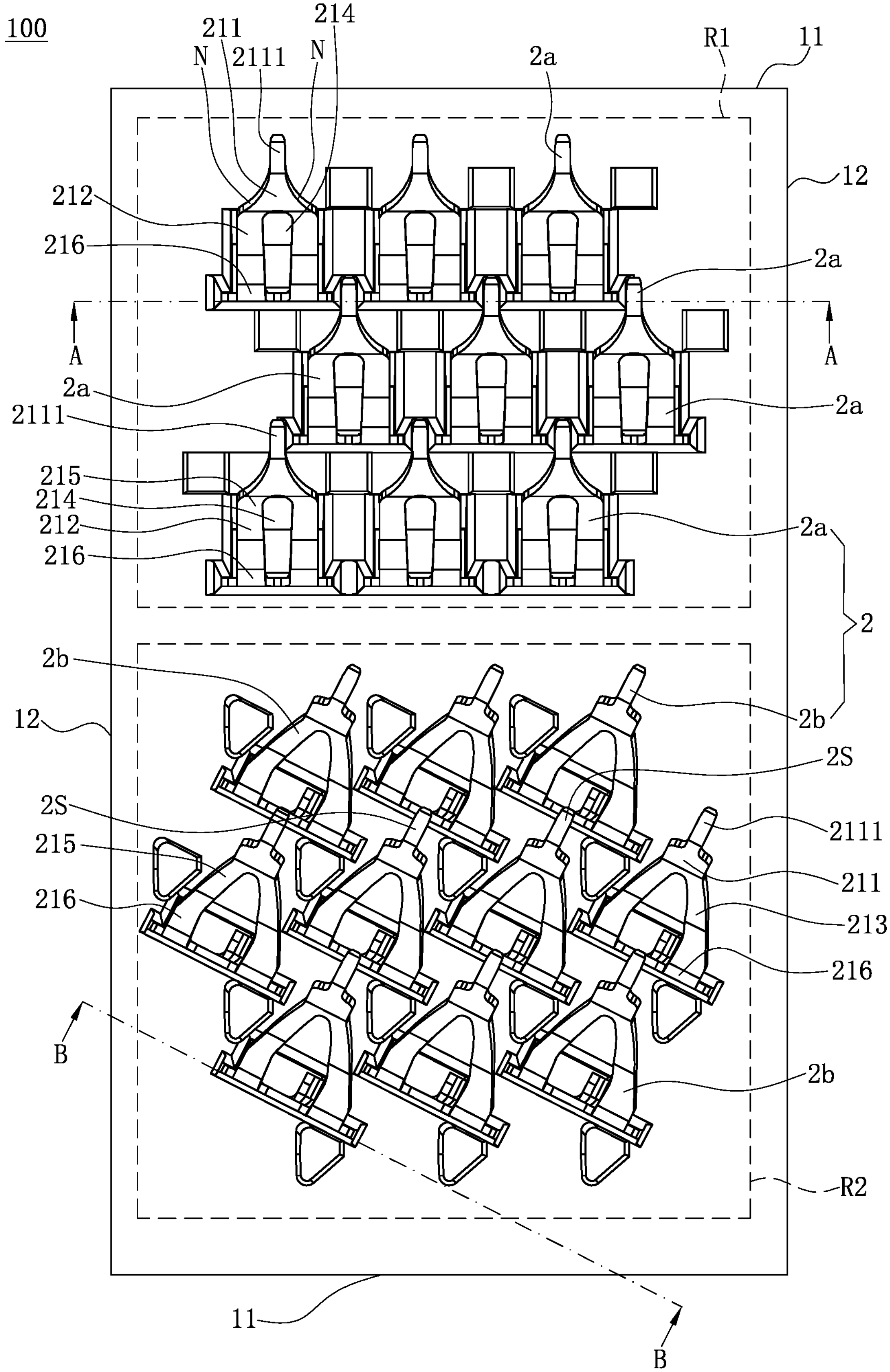
FIG. 2 is a top view of the electrical connector in FIG. 1 after the first and second terminals are assembled with an insulating body.

As shown in FIG. 1 and FIG. 2, the insulating body 1 has a first region R1 and a second region R2. The first region R1 and the second region R2 are both located in a frame-shaped region surrounded by the two first side edges 11 and the two second side edges 12. In other embodiments, the area surrounded by the two first side edges 11 and the two second side edges 12 may be provided to be far greater than the areas of the first region R1 and the second region R2. Thus, it is possible to provide one or more first regions R1 and one or more second regions R2 in the frame-shaped region according to actual needs.

As shown in FIG. 1 and FIG. 2, the conductive terminals 2 include a plurality of first terminals 2*a* provided in the first region R1 and a plurality of second terminals 2*b* provided in the second region R2. The second terminals 2*b* represent the conductive terminals according to the first embodiment of the present invention (referring to FIG. 8 to FIG. 10). The first terminals 2*a* include a plurality of single-ended signal terminals used for transmitting low speed signals, and the second terminals 2*b* include a plurality of ground terminals and a plurality of differential signal terminals 2S used for transmitting high speed signals. The ground terminals are used for shielding the differential signal terminals 2S. For convenience to observe the arrangement of the second terminals 2*b*, the accompanying drawings of the present embodiment schematically show only two of the differential signal terminals 2S and the surrounding eight ground terminals adjacent to the two differential signal terminals 2S.

For convenience of understanding, in the present embodiment, in the description of the specific structures of the conductive terminal 2, an extending direction of the terminal itself is used as a reference to define the location relationships between the structures of the conductive terminal 2, where a vertical direction (Z-axis), a left-right direction (X-axis) and a front-rear direction (Y-axis) are defined. The vertical direction defined in the terminal is identical to the vertical direction defined in the insulating body.

Figure 7:
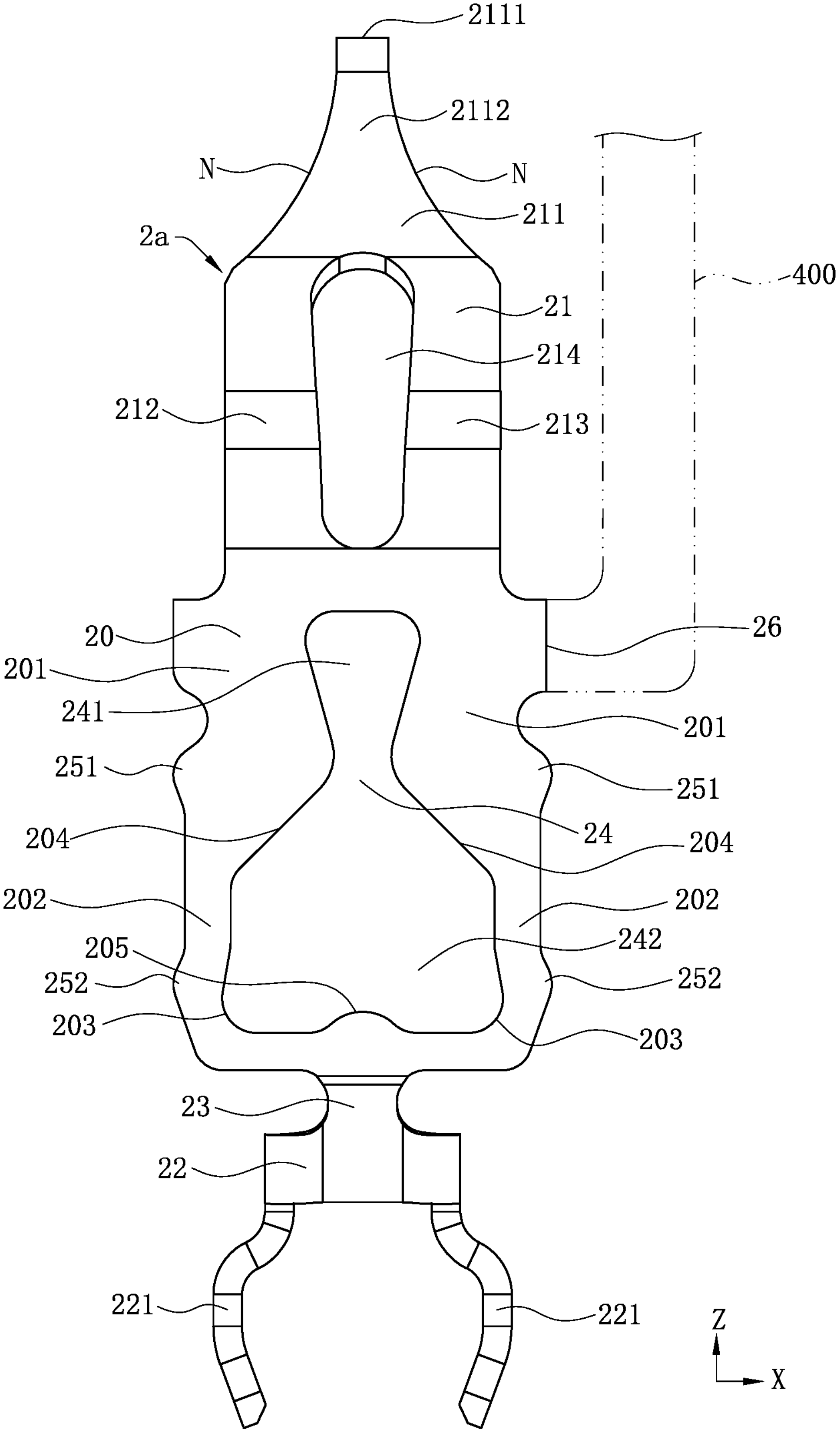
FIG. 7 is a main view of FIG. 6.
Figure 9:
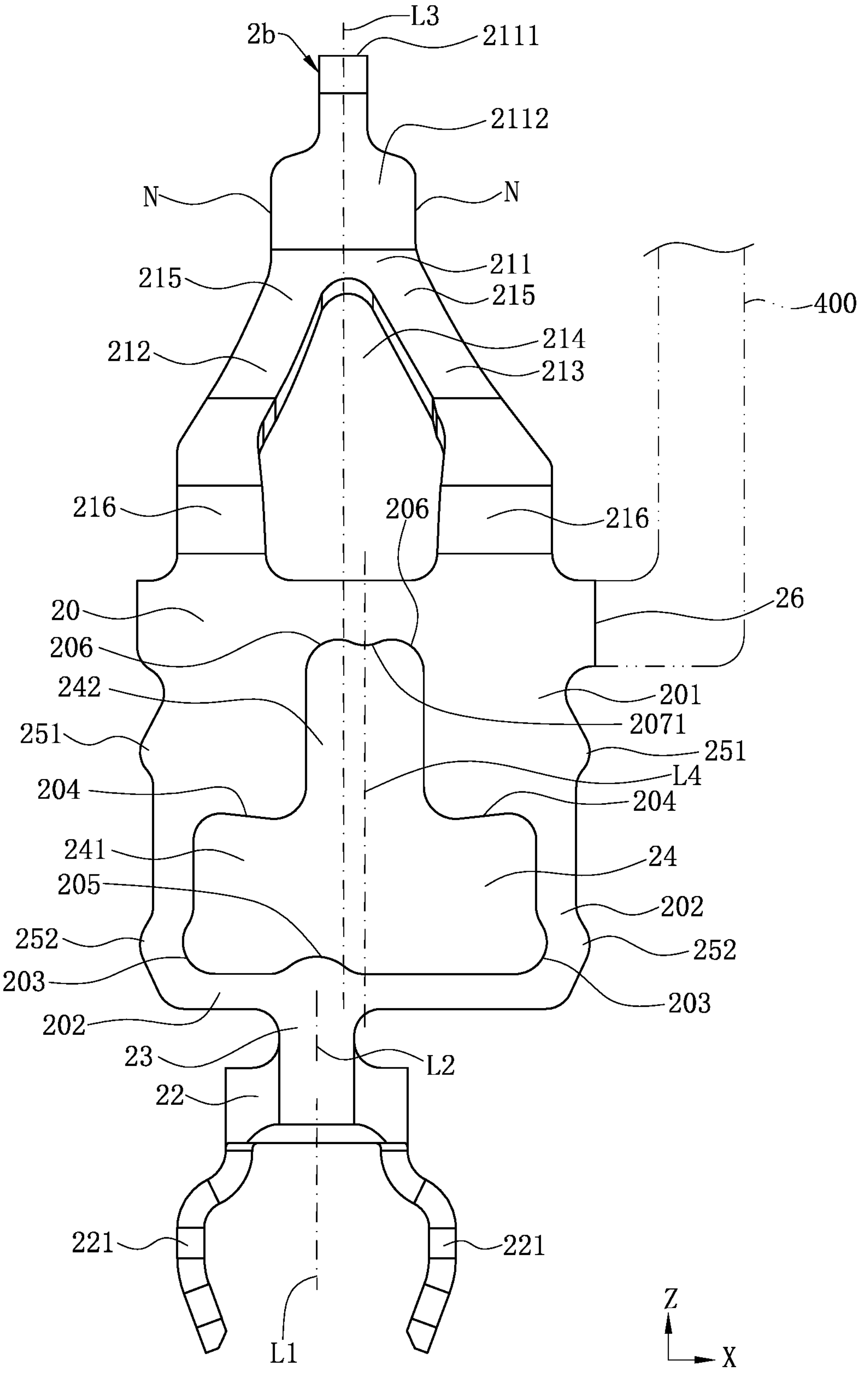
FIG. 9 is a main view of FIG. 8.

As shown in FIG. 1, FIG. 7 and FIG. 9, the first terminals 2*a* and the second terminals 2*b* are all formed by punching a metal plate. Each terminal includes a base portion 20, an elastic arm 21 formed by extending upward from one end of the base portion 20, a conductive portion 22 located below the base portion 20, a connecting arm 23 connected to the base portion 20 and the conductive portion 22, a through hole 24 running through the base portion 24, a plurality of protrusions 25 located at the left and right sides of the base portion 20, and a strip connecting portion 26. In the present embodiment, the conductive portion 22 is a soldering portion. In other embodiments, the conductive portion 22 may be an elastic arm structure, which may elastically abut the circuit board 300.

Figure 6:
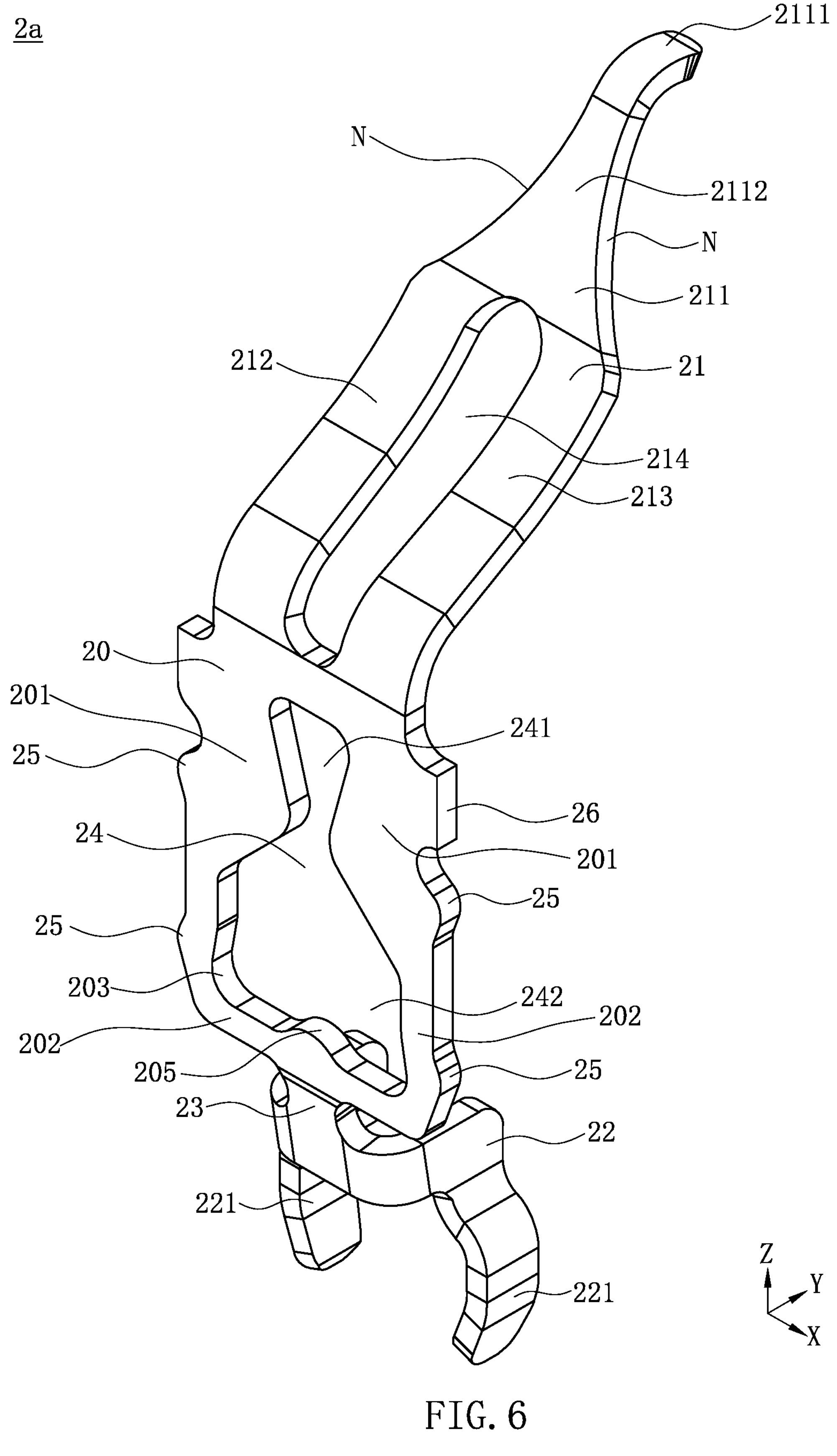
FIG. 6 is a perspective view of the first terminal of the electrical connector of FIG. 1.
Figure 8:
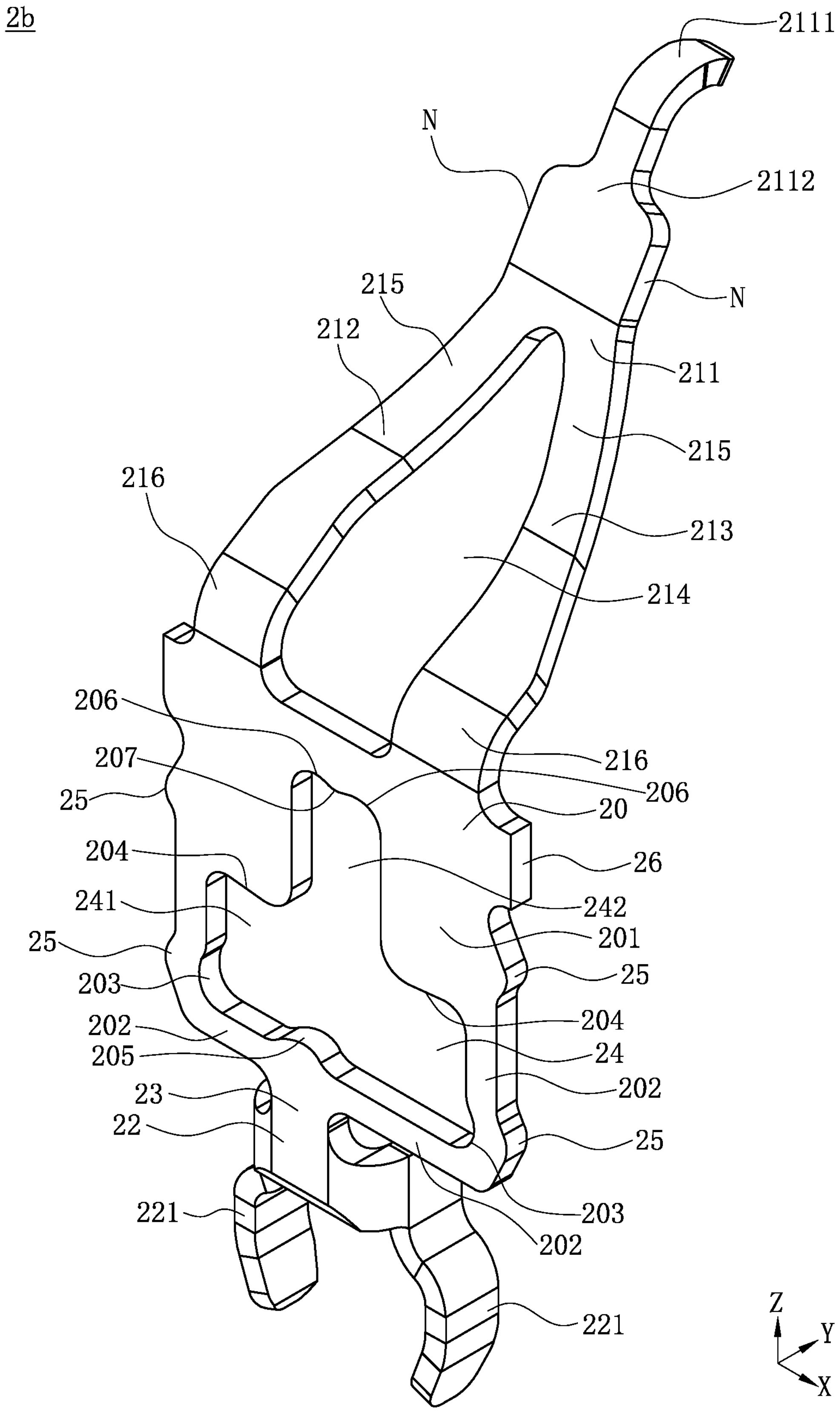
FIG. 8 is a perspective view of the second terminal of the electrical connector of FIG. 1.

As shown in FIG. 6 and FIG. 8, the base portion 20 of each first terminal 2*a* and the base portion 20 of each second terminal 2*b* are both flat plate structures and extend vertically. The two plate surfaces of the base portion 20 are provided opposite to each other in the front-rear direction, and the through hole 24 runs through the base portion 20 in the front-rear direction. A maximum width of the base portion 20 of each first terminal 2*a* is less than a maximum width of the base portion 20 of each second terminal 2*b* (referring to FIG. 7 and FIG. 9).

As shown in FIG. 6 and FIG. 8, the through hole 24 has a wide portion 241 and a narrow portion 242. The wide portion 241 is located below the narrow portion 242 and is in communication with the narrow portion 242. The shapes of the wide portion 241 and the narrow portion 242 of each first terminal 2*a* and the shapes of the wide portion 241 and the narrow portion 242 of each second terminal 2*b* are correspondingly different.

As shown in FIG. 7 and FIG. 9, each of the base portion 20 of each first terminal 2*a* and the base portion 20 of each second terminal 2*b* has two first branches 201 and two second branches 202, two concave portion 203, two oblique surfaces 204 and a first protruding bump 205. The two first branches 201 are formed at the left and right sides of the narrow portion 242 and are connected to the second branches 202. The two second branches 202 are provided corresponding to the wide portion 241, and each second branch 202 is connected to one of the first branches 201. The two second branches 202 are connected to the connecting arm 23. A size of each of the second branches 202 located at a left side and a right side of the wide portion 241 in the left-right direction is not greater than one half of a size of each of the first branches 201 in the left-right direction, and a size of the second branch 202 located below the wide portion 241 in a vertical direction is not greater than one half of a size of each of the first branches 201 in the left-right direction. The first branches 201 are located above the second branches 202. That is, a portion of the base portion 20 adjacent to the elastic arm 21 in the vertical direction has more material of the metal plate, thereby ensuring the portion of the base portion 20 of the conductive terminal 2 adjacent to the elastic arm 21 to have higher strength to provide strength and support for the elastic arm 21. The wide portion 241 is provided to be closer to the connecting arm 23 than the narrow portion 242 in the vertical direction, such that the width of each second branch 202 is less than the width of each first branch 201, and the width of each second branch 202 is provided to be no greater than one half of the width of each first branch 201, such that the portion of the base portion 20 adjacent to the connecting arm 23 has better flexibility.

As shown in FIG. 6 and FIG. 8, the respective first protruding bumps 205 of each of the first terminal 2*a* and the second terminal 2*b* is formed by protruding upward relative to a bottom portion of the corresponding wide portion 241. The connecting arm 23 is connected to the two second branches 202 below the corresponding first protruding bump 205. The bottom portion of the wide portion 241 is substantially a straight line structure, and a curve exists at each of two ends thereof to transition and extend upward. The first protruding bump 205 separates the bottom portion of the wide portion 241 to become a left portion and a right portion, and the first protruding bump 205 bulges upward relative to the straight line, such that the conductive terminal 2 forms a concave-convex fit in the punching process that forms the through hole 24, thereby preventing the terminal from jumping in the strong convection generated when the punching apparatus vibrates and the punch moves in high speed. Since the second branch 202 has a relatively shorter size in the vertical direction, and the connecting arm 23 has a relatively shorter width in the left-right direction, providing the first protruding bump 205 in the aforementioned location may prevent from jumping, and may enhance the strength of the connecting location of the base portion 20 and the connecting arm 23.

As shown in FIG. 6 and FIG. 8, the first terminal 2*a* and the second terminal 2*b* are provided with two protrusions 25 at each of the left and right sides of base portion 20 correspondingly. The protrusions 25 located at the two sides of the narrow portion 242 are defined as first protrusions 251, and the protrusions 25 located at the two sides of the wide portion 241 are defined as second protrusions 252. The first protrusions 251 are located above the second protrusions 252 and are spaced apart from the second protrusions 252 (referring to FIG. 7 and FIG. 9). In other embodiments, more than two protrusions 25 may be provided at each of the left and right sides of base portion 20 according to actual needs, and the specific quantity of the protrusions 25 are not hereinafter limited thereto.

As shown in FIG. 3 and FIG. 4, the respective first protrusions 251 and the respective second protrusions 252 of the first terminal 2*a* and the second terminal 2*b* are engaged with the slot walls of the corresponding terminal slots 10 and are thereby fixed to the insulating body 1.

As shown in FIG. 7 and FIG. 9, the respective concave portions 203 of the first terminal 2*a* and the second terminal 2*b* are both located at the left and right sides of the corresponding wide portions 241, and are formed by concavely provided outward from the left and right sides of the corresponding wide portions 241. The respective two concave portions 203 of each of the first terminal 2*a* and the second terminal 2*b* and the corresponding two second protrusions 252 are correspondingly provided in the left-right direction, such that the overall widths of the respective second branches 202 of the first terminal 2*a* and the second terminal 2*b* maintain as consistent as possible, thereby ensuring the overall flexibility of the second branches 202 to be in a stable state, and the force being applied to the conductive terminal 2 may be uniform. The two oblique surfaces 204 of the first terminal 2*a* are located at the left and right sides of the bottom portion of the narrow portion 242 and extend obliquely upward and toward each other. The two oblique surfaces 204 of the second terminal 2*b* are formed at the top portion of the corresponding wide portion 241, are located at the left and right sides of the narrow portion 242, and extend obliquely downward and toward each other.

As shown in FIG. 7 and FIG. 9, the respective strip connecting portions 26 of the first terminal 2*a* and the second terminal 2*b* are used to be connected to a terminal strip 400. The strip connecting portion 26 is located at one of the left and right sides of the corresponding base portion 20 and extends along the vertical direction, and the strip connecting portion 26 extends upward to a top end of the base portion 20. Gaps exist between the respective strip connecting portions 26 of the first terminal 2*a* and the second terminal 2*b* and the slot walls of the corresponding terminal slots 10 (referring to FIG. 3 and FIG. 4).

As shown in FIG. 6 and FIG. 8, each of the elastic arm 21 of the first terminal 2*a* and the elastic arm 21 of the second terminal 2*b* has a contact arm 211, a first arm 212 and a second arm 213 provided at an interval in the left-right direction, and a through slot 214 formed between the first arm 212 and the second arm 213. The through slot 214 extends to the base portion 20. The first arm 212 and the second arm 213 are formed by extending upward from the upper end of the base portion 20 and are connected to the connecting arm 211. That is, the first arm 212 and the second arm 213 are both located between the contact arm 211 and the base portion 20.

Figure 10:
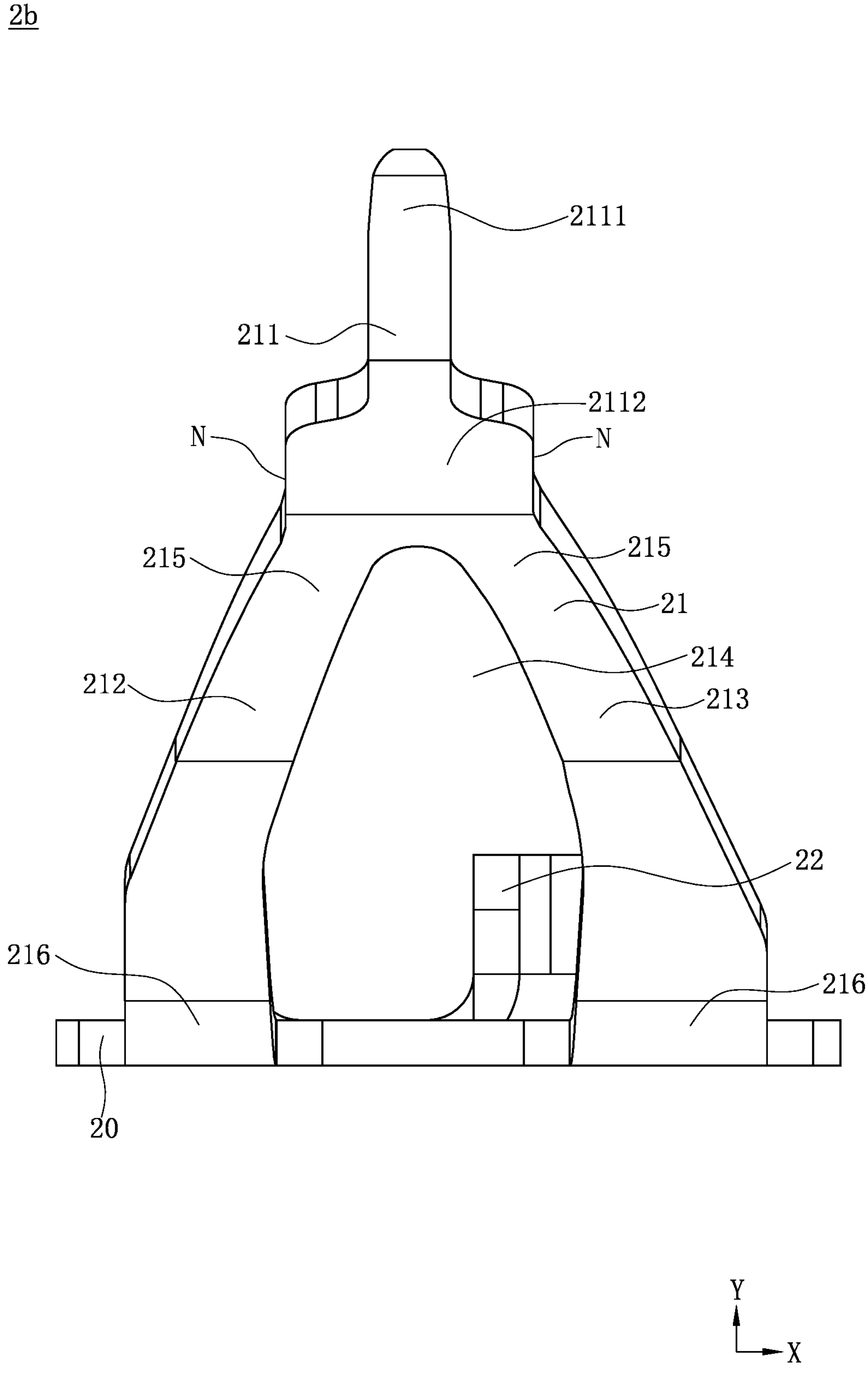
FIG. 10 is a top view of FIG. 8.

As shown in FIG. 6 and FIG. 10, each of the contact arm 211 of the first terminal 2*a* and the contact arm 211 of the second terminal 2*b* has a contact portion 2111 and a widening portion 2112 connected to the contact portion 211. The widening portion 2112 includes two side surfaces N provided opposite to each other along the left-right direction. The widening portion 2112 are connected to the corresponding first arm 212 and the second arm 213. A minimum size of the widening portion 2112 in the left-right direction is greater than a maximum size of the contact portion 2111 in the left-right direction. The contact portion 2111 is used to be in contact with the chip module 200 to form electrical connection (referring to FIG. 5). The contact arm 211 is connected to the corresponding first arm 212 and the second arm 213. A maximum width of the second arm 213 of the second terminal 2*b* in the left-right direction is greater than a maximum width of the first arm 212 in the left-right direction.

As shown in FIG. 6 and FIG. 8, each of the respective conductive portions 22 of the first terminal 2*a* and the second terminal 2*b* includes two embracing arms 221 provided at an interval along the left-right direction, and the two embracing arms 221 are used to clamp one of the solder balls 3 (referring to FIG. 3 and FIG. 4). The two embracing arms 221 are connected to the left and right sides of the connecting arm 23. Each embracing arm 221 is formed by bending and extending from one side of the connecting arm 23 along the front-rear direction and then extending downward. Specifically, each embracing arm 221 is formed by bending and extending forward from the connecting arm 23 and then extending downward.

As shown in FIG. 6 and FIG. 8, the respective connecting arms 23 of the first terminal 2*a* and the second terminal 2*b* are flat plate structures, and each connecting arm 23 and the corresponding base portion 20 are provided to be coplanar.

As shown in FIG. 9, for the second terminal 2*b* only, it is defined that the conductive portion 22 has a first central line L1 in the left-right direction, the connecting arm 23 has a second central line L2 in the left-right direction, the contact portion 2111 has a third central line L3 in the left-right direction, and the base portion 20 has a fourth central line L4 in the left-right direction. The third central line L3 and the second arm 213 are located at a left side and a right side of the fourth central line L4. That is, the central line of the contact portion 2111 in the left-right direction and the second arm 213 are located at a left side and a right side of the central line of the base portion 20 in the left-right direction, the third central line L3 and a connecting location of the second arm 213 and the base portion 20 are located at a left side and a right side of the fourth central line L4. The first central line L1 and the second central line L2 are collinear, and the first central line L1 and the third central line L3 are located at a same side of the fourth central line L4 in the left-right direction.

According to the formula of bulk impedance=ρ*I/A (where ρ is the electrical resistivity coefficient, I is the length of the terminal, and A is the cross-sectional area of the terminal) and the formula of the maximum current that the terminal can withstand $J=(2\gamma*k)^{1/2}*A*\Delta T/I$ (where ΔT is the temperature increase, γ is the electrical conductivity, k is the thermal conductivity, I is the conductive length, and A is the electricity passing area), it is known that the maximum current J of the terminal and the bulk impedance are inversely proportional. According to the formula of high frequency impedance $(Z)=\sqrt{L/C}$, where L is the self-inductance of the terminal and C is the self-capacitance, the self-inductance L of the terminal is positively correlated to the length I of the terminal, and the self-capacitance C of the terminal is positively correlated to the cross-sectional area A of the terminal, so it is known that the high-frequency impedance (Z) of the terminal is proportional to the size of the bulk impedance.

Figure 5:
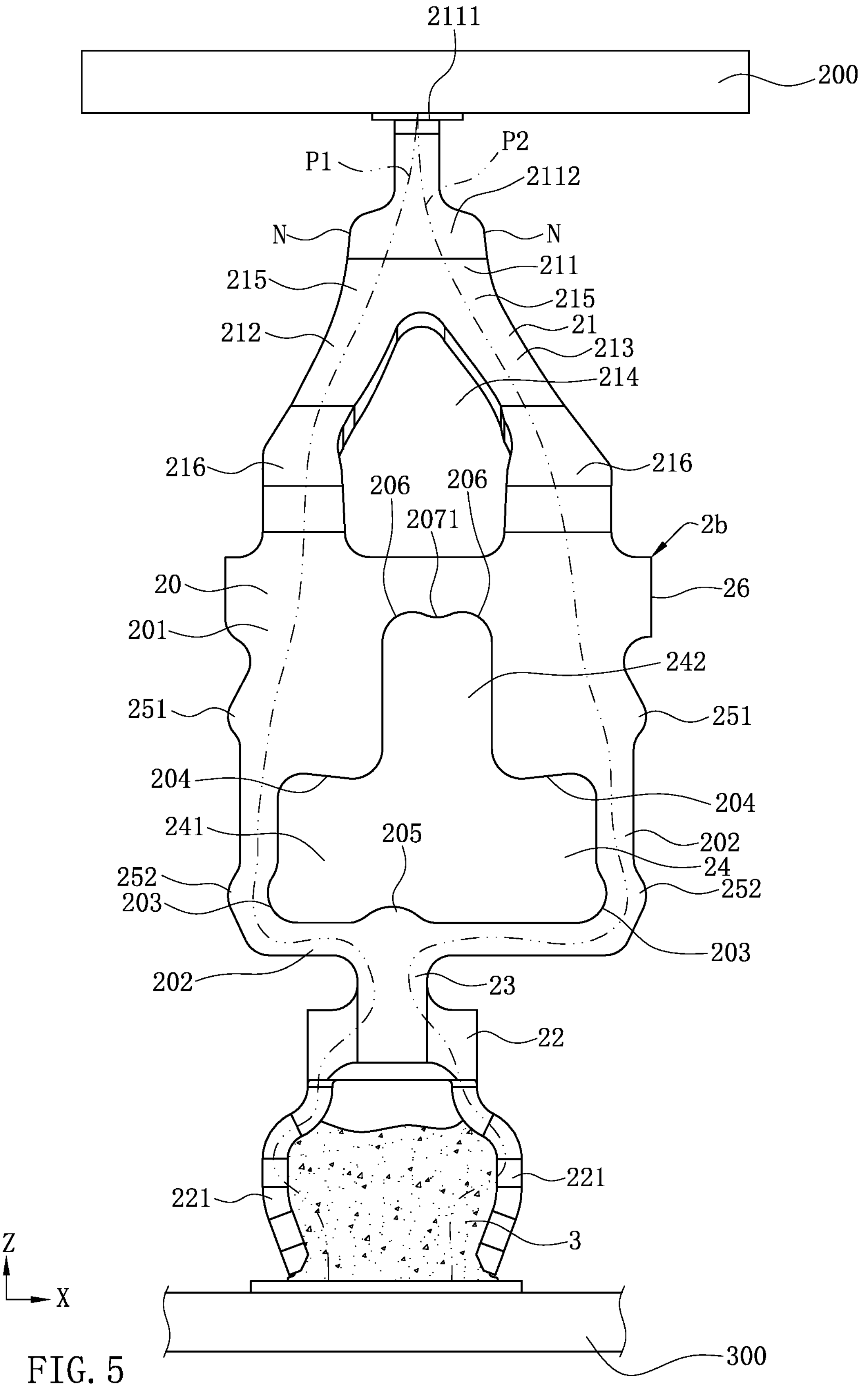
FIG. 5 is a schematic view of FIG. 4 showing only the second terminal being pressed against the chip module and soldered to the circuit board.

As shown in FIG. 5, FIG. 9 and FIG. 10, for the second terminal 2*b* only, a length of a conductive path P1 from the contact portion 2111 through the first arm 212 to a connecting location of the first arm 212 and the base portion 20 is shorter than a length of a conductive path P2 from the contact portion 2111 through the second arm 213 to a connecting location of the second arm 213 and the base portion 20, the connecting arm 23 and the conductive portion 22 deviates toward a same side relative to the fourth central line L4 of the base portion 20 in the left-right direction, and a length of a shortest conductive path P2 from the contact portion 2111 to the conductive portion 22 through the second arm 213 is longer than a length of a shortest conductive path P1 from the contact portion 2111 to the conductive portion 22 through the first arm 212. According to the aforementioned formula of bulk impedance, the length of the second arm 213 is longer than the length of the first arm 212. Thus, a maximum width of the second arm 213 in the left-right direction is provided to be greater than a maximum width of the first arm 212 in the left-right direction, such that the bulk impedance of the first arm 212 and the bulk impedance of the second arm 213 are as symmetrical as possible. That is, it is ensured that the "maximum current being capable of withstanding" and "mechanical properties" of the first arm 212 and the second arm 213 are consistent as much as possible. Similarly, according to the aforementioned formula of high frequency impedance (Z), it is known that the longer the terminal is, the larger the self-inductance L is, and the larger the terminal cross-sectional area A (that is, the terminal width) is, the larger the self-capacitance C is. The length of the second arm 213 is longer than the length of the first arm 212, and a maximum width of the second arm 213 in the left-right direction is provided to be greater than a maximum width of the first arm 212 in the left-right direction, which is conducive to the high frequency impedances (Z) of the first arm 212 and the second arm 213 being symmetrical, and conducive to the high frequency characteristics of the first arm 212 and the second arm 213 maintaining consistent.

As shown in FIG. 8 and FIG. 9, for the second terminal 2*b*, the base portion 20 further includes two first curve surfaces 206 and a second protruding bump 207. The two first curve surfaces 206 are formed on the top portion of the narrow portion 242, and both of the first curve surfaces arch upward. The second protruding bump 207 is formed by protruding downward relative to the top portion of the narrow portion 242, and the first protruding bump 205 is located below the second protruding bump 207 and is spaced apart from the protruding bump 207. The third central line L3 passes through the first protruding bump 205 and the second protruding bump 207 along the vertical direction. That is, the distance of the first protruding bump 205 and the second protruding bump 207 in the left-right direction is provided to be proximate, such that the shape of the through hole 24 is relatively regular, and the force being applied to the metal plate in the punching process is uniform, such that punching is more stable and blanking is easier. The second protruding bump 207 has a second curve surface 2071 arching downward, and the two first curve surfaces 206 are respectively located at a left side and a right side of the second protruding bump 207 and are connected to the second curve surface 2071, thereby allowing the narrow portion 242 to be in a wave shape, thus preventing from jumping.

As shown in FIG. 8 and FIG. 9, for the second terminal 2*b*, at least portions of the first arm 212 and the second arm 213 extend obliquely to be closer to each other upward from bottom thereof and are connected to the widening portion 2112. A maximum width of one end of the first arm 212 away from the elastic arm 21 is greater than a maximum width of one end of the second arm 213 away from the elastic arm 21. That is, the width of a connecting location of the second arm 213 and the base portion 20 in the left-right direction is greater than the width of a connecting location of the first arm 212 and the base portion 20 in the left-right direction. A width of a connecting location of the first arm 212 and the contact arm 211 is equal to a width of a connecting location of the second arm 213 and the contact arm 211. In other embodiments, the first arm 212 and the second arm 213 of the second terminal 2*b* may be provided such that only a portion of one of them extends obliquely to be closer to the other upward from bottom thereof. Alternatively, the first arm 212 and the second arm 213 may be provided such that both in their entireties extend obliquely to be closer to each other upward from bottom thereof.

As shown in FIG. 9 and FIG. 10, for the second terminal 2*b* only, the structure of the elastic arm 21 may be divided from the vertical direction. The elastic arm 21 includes a first portion 215 and a second portion 216 connected to each other, and the first portion 215 is located above the second portion 216. The first portion 215 is connected to the corresponding contact arm 211, and the second portion 216 is connected to the corresponding base portion 20. The through slot 214 extends in the first portion 215 and the second portion 216. That is, the portion of the elastic arm 21 close to the contact arm 211 is the first portion 215, the first portion 215 and the contact arm 211 are provided to be symmetrical in the left-right direction relative to the third central line L3, and the portion of the elastic arm 21 close to the base portion 20 is the second portion 216.

As shown in FIG. 7 and FIG. 9, the two side surfaces N of the first terminal 2*a* are arc-shaped and are provided opposite to each other in the left-right direction. The two side surfaces N of the first terminal 2*a* extend to be closer to each other upward from bottom thereof. The two side surfaces N of the second terminal 2*b* are parallel to each other in the left-right direction. Thus, the widening portion 252 of the second terminal 2*b* has a larger area, and in the second region R2, the shielding effect of the eight ground terminals to the two differential signal terminals 2S will be better (referring to FIG. 2), thus reducing the crosstalk between adjacent differential signal pairs, and thereby improving high frequency.

FIG. 11 to FIG. 16 show an electrical connector according to a second embodiment of the present invention. The electrical connector 100 includes an insulating body 1, a plurality of conductive terminals 2 provided in the insulating body 1 and a plurality of solder balls 3 conductively connected to the conductive terminals 2 correspondingly. The conductive terminal 2 as shown in FIG. 13 to FIG. 16 also represents the conductive terminals according to the second embodiment of the present invention.

Figure 11:
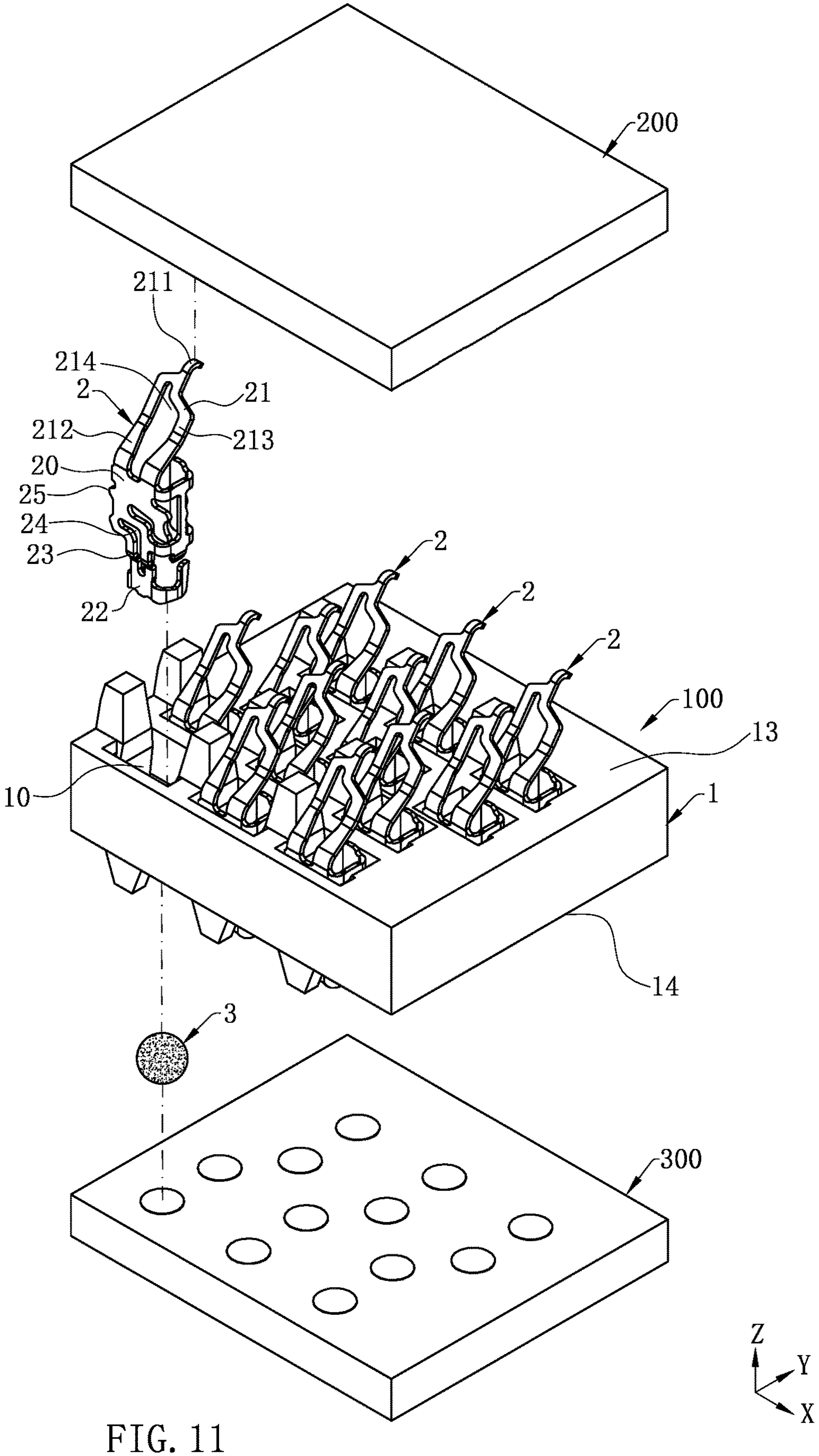
FIG. 11 is a perspective view of an electrical connector according to a second embodiment of the present invention not being conductively connected to a chip module and a circuit board.
Figure 12:
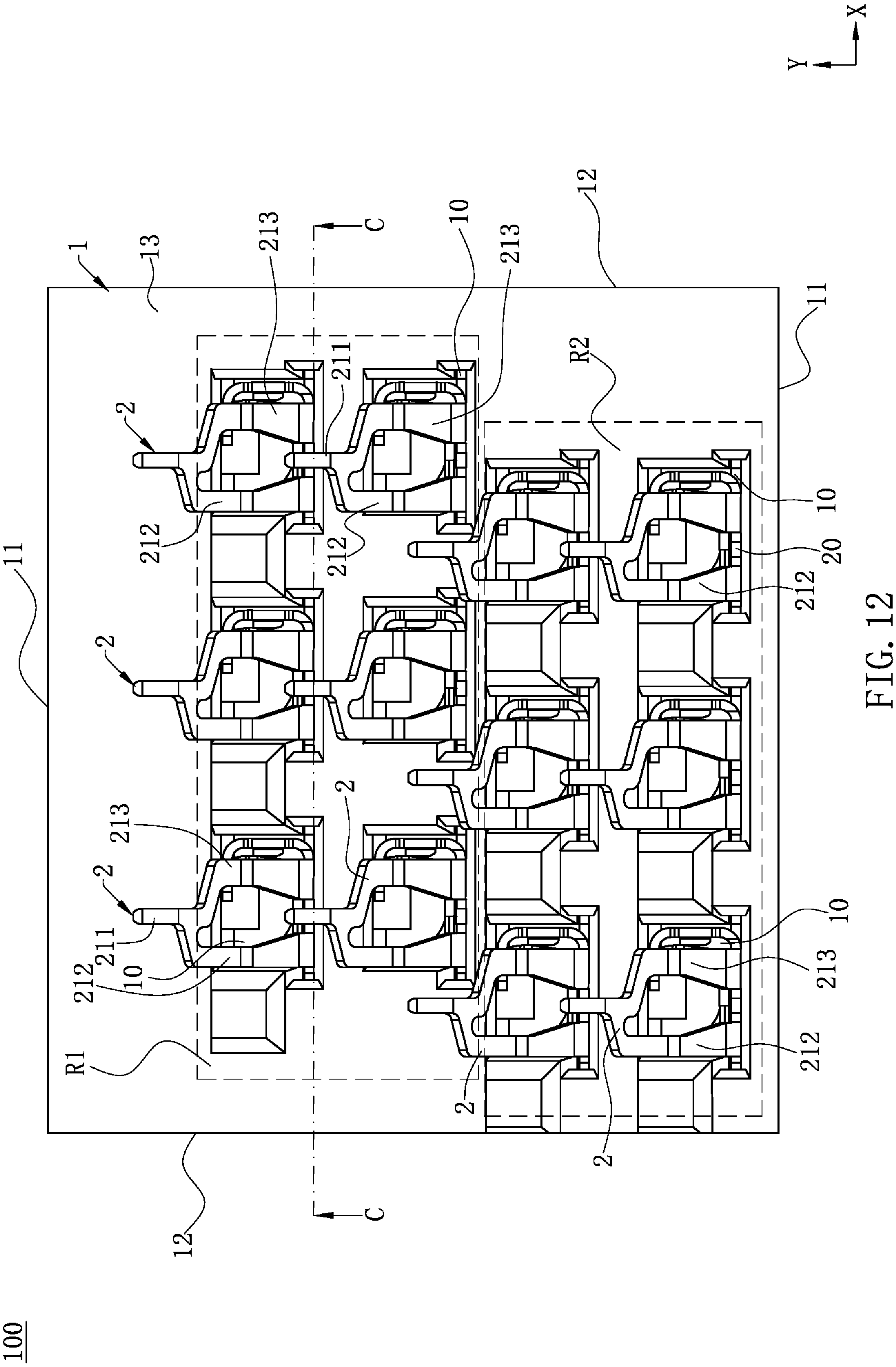
FIG. 12 is a top view of FIG. 11 showing only the electrical connector after the conductive terminals are assembled to the insulating body.
Figure 13:
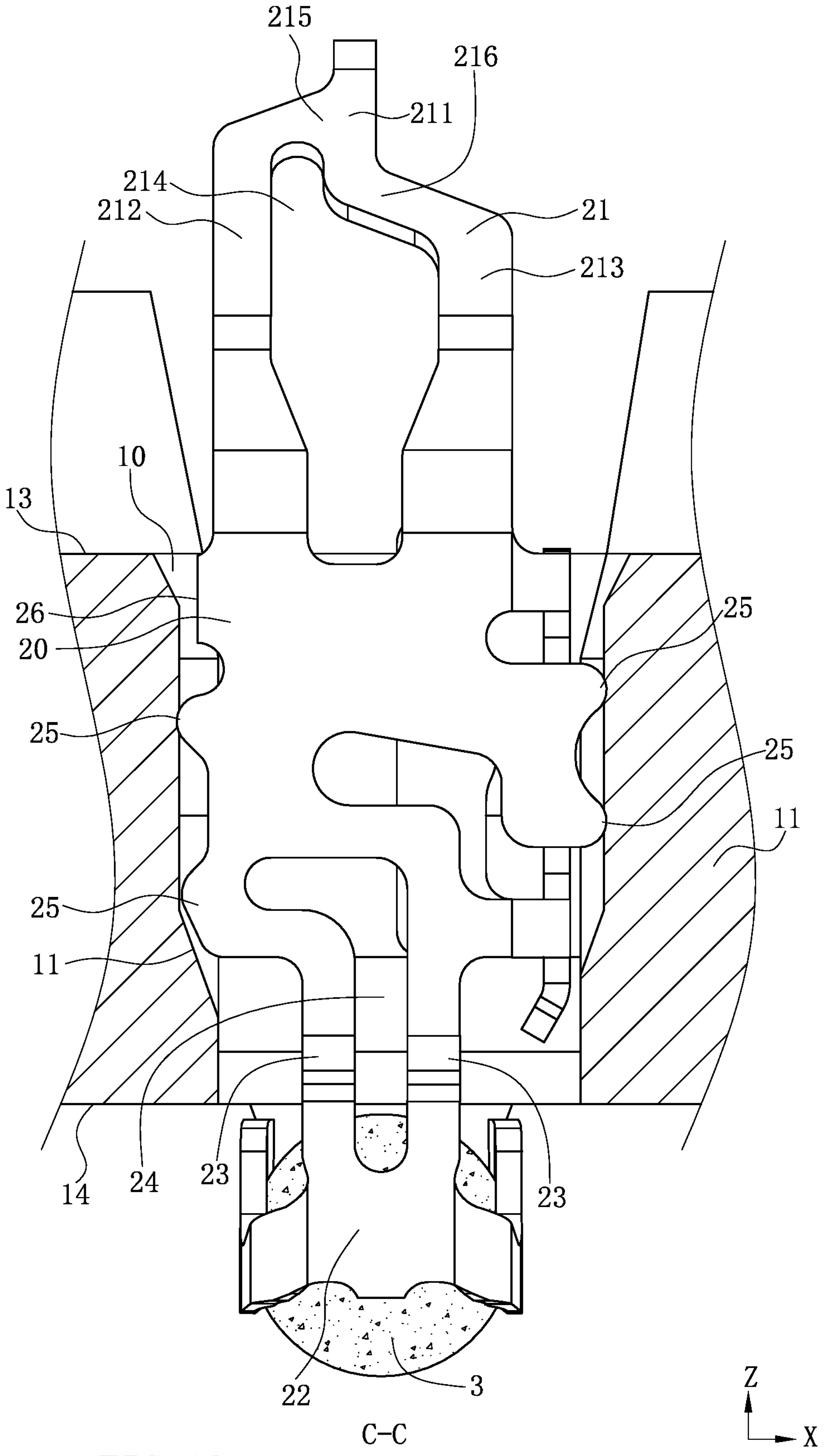
FIG. 13 is a partial sectional view of FIG. 12 sectioned along the C-C direction.

As shown in FIG. 11 to FIG. 13, the insulating body 1 is formed by a plastic material, and includes a plurality of terminal slots 10, two first side edges 11 provided opposite to each other, two second side edges 12 provided opposite to each other, and an upper surface 13 and a lower surface 14 provided opposite to each other along a vertical direction. Each terminal slot 10 runs through the upper surface 13 and the lower surface 14. The terminal slots 10 one-to-one correspondingly accommodate the conductive terminals 2. The first side edges 11 and the second side edges 12 are perpendicular to each other.

As shown in FIG. 12, the terminal slots 10 are provided in a plurality of rows along the front-rear direction. The insulating body 1 includes a first region R1 and a second region R2 provided adjacent to each other in the front-rear direction. The first region R1 is provided with at least one row of the terminal slots 10, and the second region R2 is provided with at least one row of the terminal slots 10. In the present embodiment, the first region R1 is provided with a plurality of rows of the terminal slots 10 aligning in the front-rear direction, and the second region R2 is provided with a plurality of rows of the terminal slots 10 aligning in the front-rear direction. The two rows of the terminal slots 10 in the first region R1 and the second region R2 adjacent to each other are provided to stagger in the front-rear direction. In other embodiments, each two rows of the terminal slots 10 adjacent to each other in the front-rear direction are provided to stagger in the front-rear direction.

For convenience of understanding, in the present embodiment, in the description of the specific structures of the conductive terminal 2, an extending direction of the terminal itself is used as a reference to define the location relationships between the structures of the conductive terminal 2, where a vertical direction (Z-axis), a left-right direction (X-axis) and a front-rear direction (Y-axis) are defined. The vertical direction defined in the terminal is identical to the vertical direction defined in the insulating body.

Figure 15:
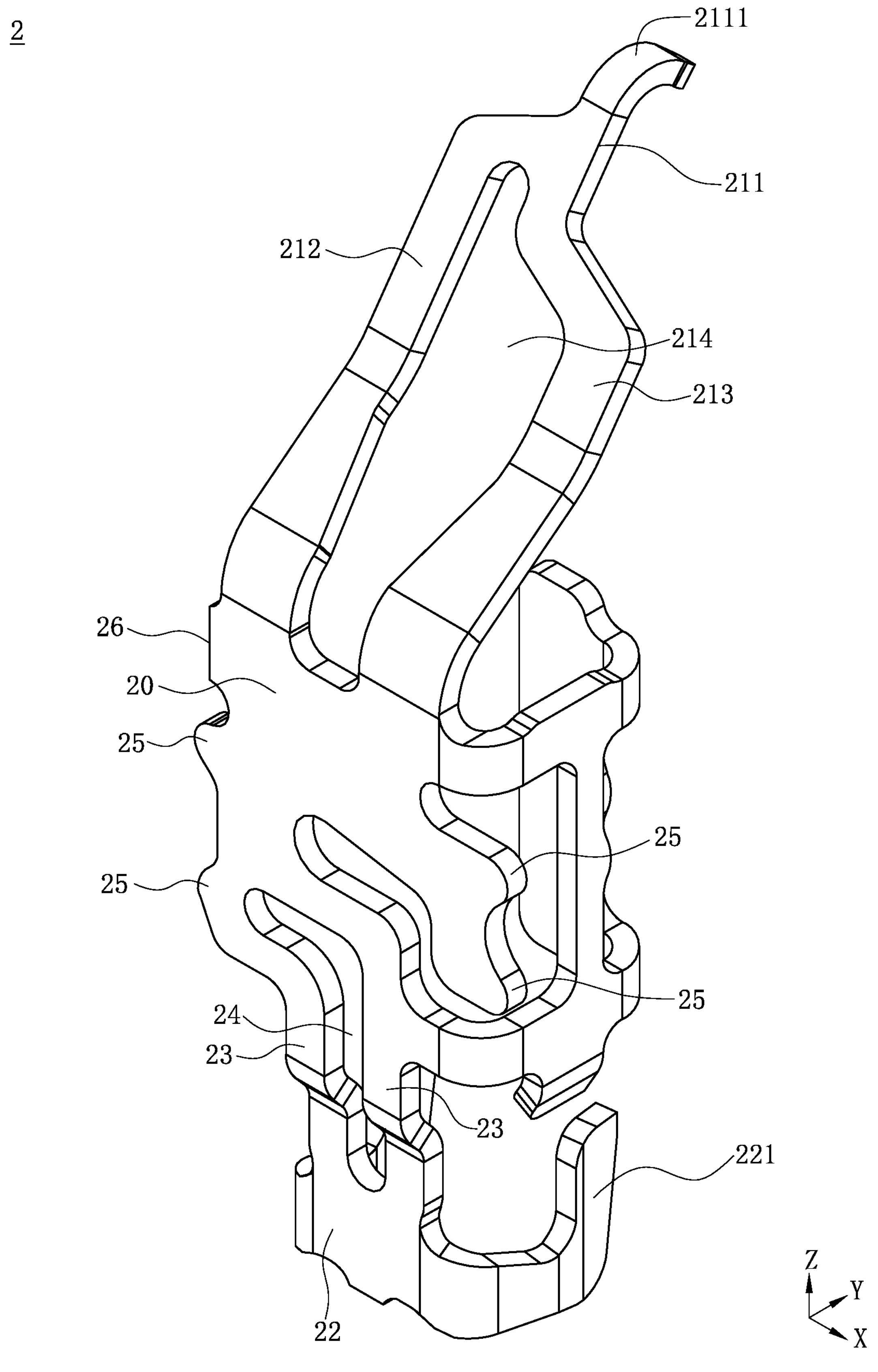
FIG. 15 is a perspective view of a conductive terminal of the electrical connector of FIG. 11.
Figure 16:
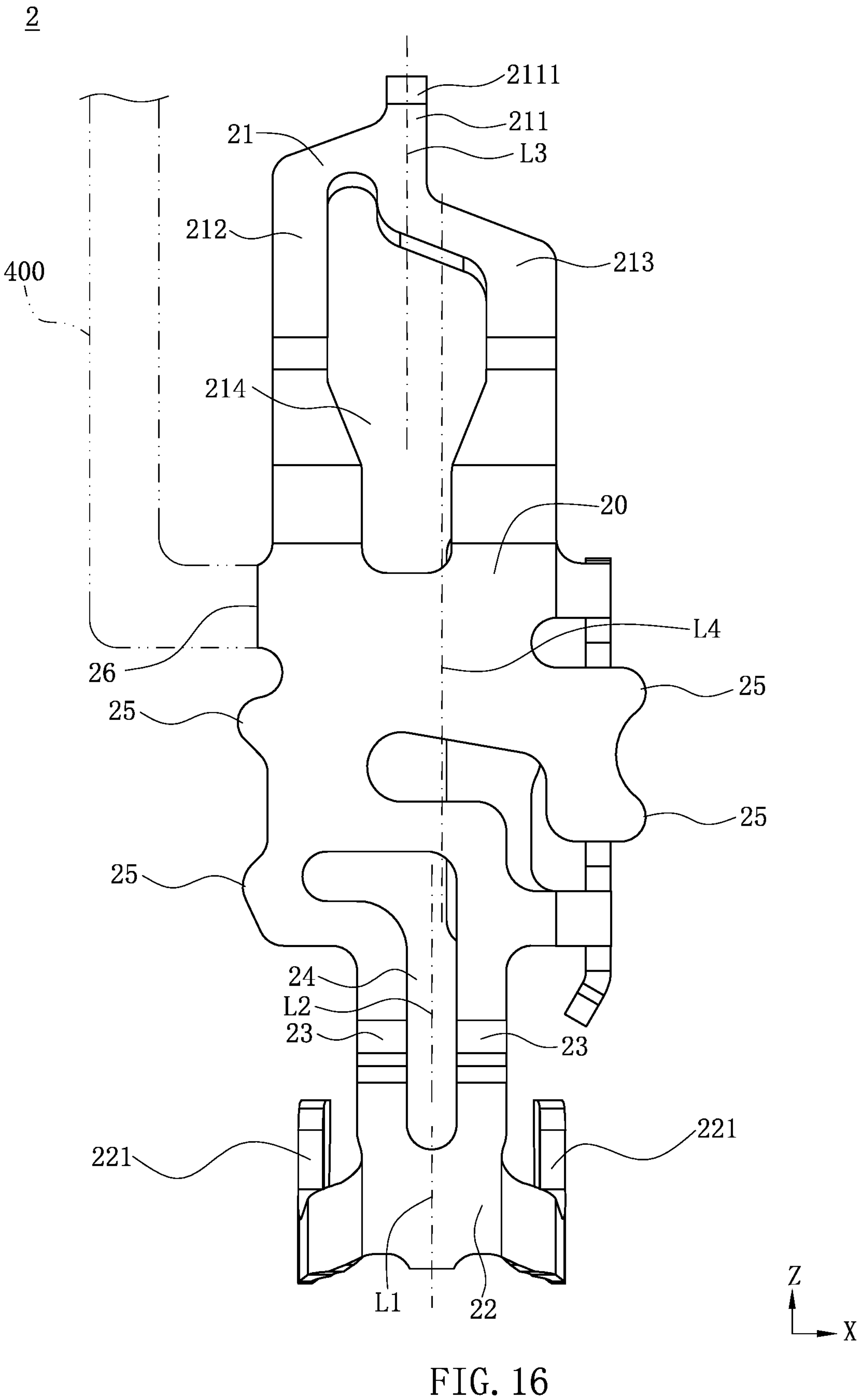
FIG. 16 is a main view of FIG. 15.

As shown in FIG. 15 and FIG. 16, each conductive terminal 2 is formed by punching a metal plate. Each conductive terminal 2 includes a base portion 20, an elastic arm 21 formed by extending upward from one end of the base portion 20, a conductive portion 22 located below the base portion 20, a connecting arm 23 connected to the base portion 20 and the conductive portion 22, a through hole 24 running through the base portion 24, a plurality of protrusions 25 located at the left and right sides of the base portion 20, and a strip connecting portion 26. The base portion 20 is flat plate shaped. In the present embodiment, the conductive portion 22 is a soldering portion, and the through hole 24 extends to the connecting arm 23.

As shown in FIG. 15 and FIG. 16, the elastic arm 21 includes a contact arm 211, a first arm 212 and a second arm 213 provided at an interval in the left-right direction, and a through slot 214 formed between the first arm 212 and the second arm 213. The through slot 214 extends to the base portion 20. The first arm 212 and the second arm 213 are formed by extending upward from the upper end of the base portion 20 and are connected to the connecting arm 211. That is, the first arm 212 and the second arm 213 are both located between the contact arm 211 and the base portion 20.

As shown in FIG. 16, the contact arm 211 includes a contact portion 2111. The contact portion 2111 is used to be in contact with the chip module 200 to form electrical connection (referring to FIG. 14). The contact arm 211 is connected to the corresponding first arm 212 and the second arm 213. A maximum width of the second arm 213 in the left-right direction is greater than a maximum width of the first arm 212 in the left-right direction, thus increasing the width of the conducting path of the second arm 213. Specifically, the width of a connecting location of the second arm 213 and the base portion 20 in the left-right direction is greater than the width of a connecting location of the first arm 212 and the base portion 20 in the left-right direction, such that the strength of the second arm 213 is stronger, and in the same cross-section, the signal transmission channel of the second arm 213 is widened compared to that of the first arm 212, which is conducive to adjusting the impedance of the second arm 213, thereby improving high frequency.

As shown in FIG. 16, it is defined that the conductive portion 22 has a first central line L1 in the left-right direction, the connecting arm 23 has a second central line L2 in the left-right direction, the contact portion 2111 has a third central line L3 in the left-right direction, and the base portion 20 has a fourth central line L4 in the left-right direction. The third central line L3 and a connecting location of the second arm 213 and the base portion 20 are located at a left side and a right side of the fourth central line L4. That is, the central line of the contact portion 2111 in the left-right direction and the connecting location of the second arm 213 and the base portion 20 are located at a left side and a right side of the central line of the base portion 20 in the left-right direction. In this embodiment, the third central line L3 and most of the second arm 213 are located at a left side and a right side of the fourth central line L4. The first central line L1 and the second central line L2 are collinear, and the first central line L1 and the third central line L3 are located at a same side of the fourth central line L4.

Figure 14:
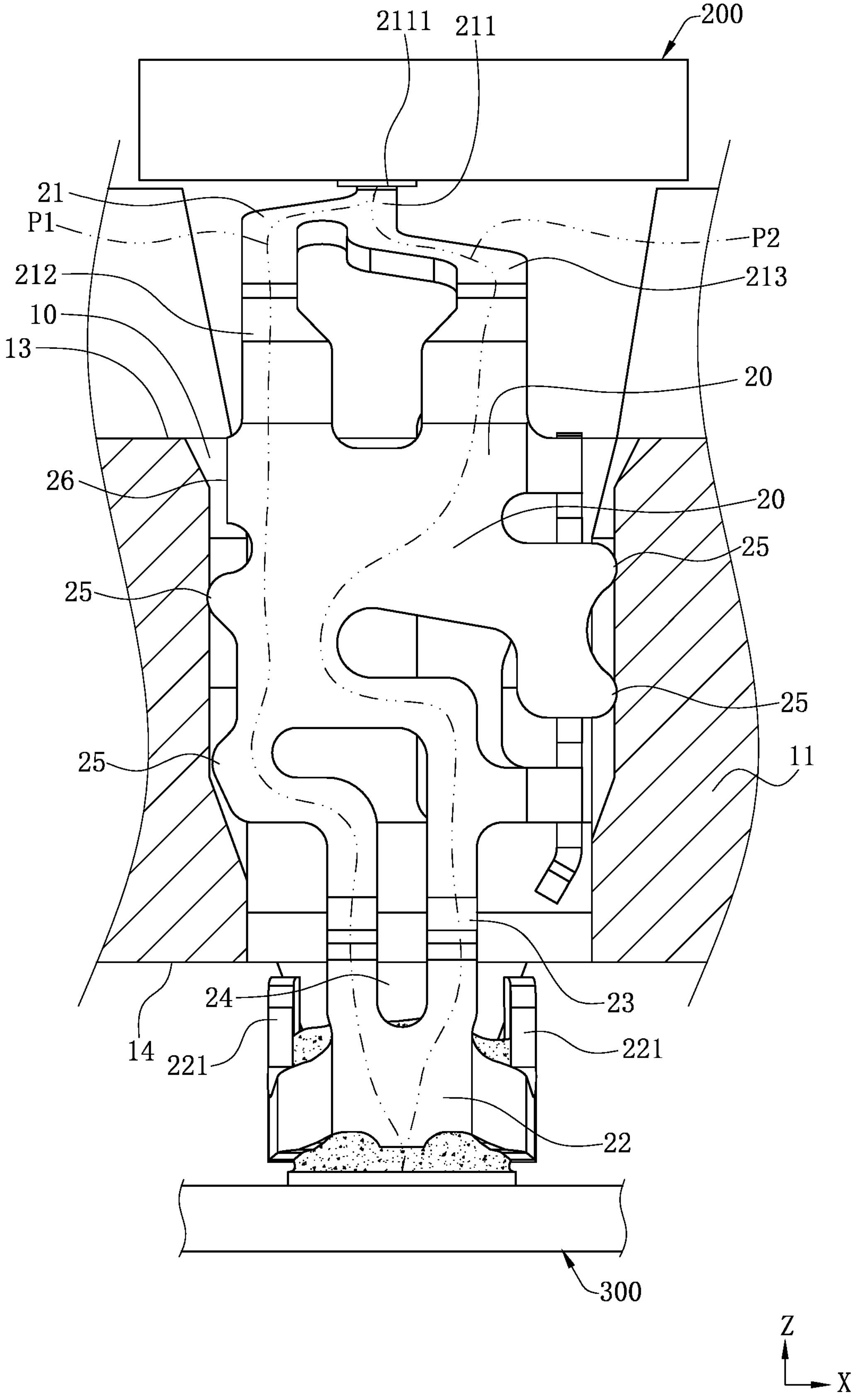
FIG. 14 is a schematic view of FIG. 13 showing a conductive terminal being pressed against the chip module and soldered to the circuit board.

As shown in FIG. 14 and FIG. 16, for the conductive terminal 2, a length of a conductive path P1 from the contact portion 2111 through the first arm 212 to a connecting location of the first arm 212 and the base portion 20 is slightly shorter than a length of a conductive path P2 from the contact portion 2111 through the second arm 213 to a connecting location of the second arm 213 and the base portion 20, and a length of a shortest conductive path P2 from the contact portion 2111 to the conductive portion 22 through the second arm 213 is longer than a length of a shortest conductive path P1 from the contact portion 2111 to the conductive portion 22 through the first arm 212.

As shown in FIG. 13, the base portion 20 and a portion of the connecting arm 23 are accommodated in the corresponding terminal slot 10. The conductive portion 22 includes two embracing arms 221 provided at an interval along the left-right direction, and the two embracing arms 221 are used to clamp one of the solder balls 3. The two embracing arms 221 are connected to the left and right sides of the connecting arm 23. Each embracing arm 221 is formed by bending and extending from one side of the connecting arm 23 along the front-rear direction. Specifically, each embracing arm 221 is formed by bending and extending forward from the connecting arm 23.

As shown in FIG. 13 and FIG. 16, two protrusions 25 are provided at each of the left and right sides of base portion 20. The two protrusions 25 at the same side are provided vertically at an interval. The protrusions 25 are engaged with the slot walls of the corresponding terminal slots 10, thereby fixing the conductive terminal 2 to the insulating body 1. In other embodiments, more than two protrusions 25 may be provided at each of the left and right sides of base portion 20 according to actual needs, and the specific quantity of the protrusions 25 are not hereinafter limited thereto. The strip connecting portion 26 is used to be connected to a terminal strip 400. The strip connecting portion 26 is located at one of the left and right sides of the base portion 20 and extends along the vertical direction, and the strip connecting portion 26 extends upward to a top end of the base portion 20. Gaps exist between the strip connecting portion 26 and the slot wall of the corresponding terminal slot 10.

In sum, the conductive terminal and the electrical connector having the same according to certain embodiments of the present invention have the following beneficial effects:

1. By providing the maximum width of the second arm 213 in the left-right direction to be greater than the maximum width of the first arm 212 in the left-right direction, the central line of the contact portion 2111 in the left-right direction and the connecting location of the second arm 213 and the base portion 20 are located at a left side and a right side of a central line of the base portion 20 in the left-right direction. That is, in the left-right direction, the contact portion 2111 deviates toward a side opposite to the second arm 213 relative to the base portion 20, thus widening the width of the conductive path P2 of the second arm 213, which is conducive to adjusting the impedance of the second arm 213, and enhancing the impedance matching of the second arm 213 and the first arm 212, which satisfies the high frequency characteristics of the electrical connector 100 and satisfies the customer's personalized requirements to the electrical connector 100.

2. For the conductive terminals 2 of the second embodiment of the present invention and the second terminals 2*b* of the first embodiment of the present invention, the length of the shortest conductive path P1 from the contact portion 2111 to the conductive portion 22 through the first arm 212 is shorter than the length of the shortest conductive path P2 from the contact portion 2111 to the conductive portion 22 through the second arm 213. By providing a greater width for the portion of the conductive terminal 2 from the contact portion 2111 to the conductive portion 22 having a longer conductive path P2, the maximum width of the second arm 213 in the left-right direction is provided to be greater than the maximum width of the first arm 212 in the left-right direction, such that a maximum cross-sectional area of the second arm 213 is greater than a maximum cross-sectional area of the first arm 212, thus widening the conductive path of the second arm 213, such that a ratio of the self-inductance and the self-capacitance of the first arm 212 is equal to a ratio of the self-inductance and the self-capacitance of the second arm 213, balancing the impedances of the first arm 212 and the second arm 213, thereby improving the high frequency characteristics of the electrical connector 100.

3. The third central line L3 and the connecting location of the second arm 213 and the base portion 20 are located at a left side and a right side of the fourth central line L4. That is, along the left-right direction, the central line of the contact portion 2111 and the connecting location of the second arm 213 and the base portion 20 are located at a left side and a right side of the central line of the base portion 20. By providing the width of a connecting location of the second arm 213 and the base portion 20 in the left-right direction to be greater than the width of a connecting location of the first arm 212 and the base portion 20 in the left-right direction, the support to the second arm 213 by the base portion 20 is strengthened, such that when the chip module 200 is pressed onto the electrical connector 100, the contact portion 2111 is not applied with a force to significantly deviate toward the left and right sides thereof, thereby ensuring the contact portion 2111 to stably stay in the middle and be electrically connected to the chip module 200.

4. The first protruding bump 205 is provided corresponding to the bottom portion of the through hole 24 of the conductive terminal 2 to protrude toward a side away from the connecting arm 23 in the vertical direction, such that the through hole 24 of the conductive terminal 2 forms a concave-convex fit in the punching process, thereby preventing from jumping. In the soldering process to solder the conductive portion 22 to the circuit board through a solder, the insulating body 1 deforms and warps due to the heat, thus pulling the connecting arm 23 and generating stress concentration at the location of the connecting arm 23. Thus, the connecting arm 23 is provided below the first protruding bump 205 to be connected to the base portion 20, such that a height of the base portion 20 corresponding to the connecting arm 23 in the vertical direction is increased, thereby enhancing the strength of the connecting location of the base portion 20 and the connecting arm 23.

5. The second protruding bump 207 is provided corresponding to the top portion of the through hole 24 of the conductive terminal 2 to protrude toward a side adjacent to the connecting arm 23 in the vertical direction, and the second protruding bump 207 is located above the first protruding bump 205 and is spaced apart from the first protruding bump 205, thus enhancing the concave-convex fit of the conductive terminal 2 in the punching process, thereby preventing the through hole 24 from jumping upward in the blanking process, and preventing from affecting the forming of the next conductive terminal 2.

6. The third central line L3 passes through the first protruding bump 205 and the second protruding bump 207 along the vertical direction. That is, the distance of the first protruding bump 205 and the second protruding bump 207 in the left-right direction is provided to be proximate, such that the shape of the through hole 24 is relatively regular, and the force being applied to the metal plate in the punching process is uniform, such that punching is more stable and blanking is easier.

7. The base portion 20 is provided with the through hole 24, the through hole 24 is provided with the wide portion 241 and the narrow portion 242, and the narrow portion 242 is located above the wide portion 241, thus ensuing the base portion 20 to have sufficient strength at the location near the narrow portion 242, providing strength for the required deformation of the elastic arm 21 when being pressed downward, and reducing the strength of the lower end of the conductive terminal 2, which is convenient for deformation and prevents from tin cracking.

8. A size of each of the second branches 202 located at a left side and a right side of the wide portion 241 in the left-right direction is not greater than one half of a size of each of the first branches 201 in the left-right direction, and a size of the second branch 202 located below the wide portion 241 in a vertical direction is not greater than one half of a size of each of the first branches 201 in the left-right direction, thus enhancing the elasticity of the conductive terminal 2, and preventing from tin cracking in a high temperature testing process.

9. The first protrusions 251 and the second protrusions 252 are provided at the left and right sides of the base portion 20, such that the conductive terminal 2 may be stably fixed in the insulating body 1. The concave portion 203 are provided at the left and right sides of the through hole 24, such that the widths of the second branches 202 at the left and right sides of the wide portion 241 maintain basically consistent, thereby ensuring the overall flexibility of the second branches 202 to be in a stable state, such that the force being applied to the conductive terminal 2 may be uniform, and the conductive terminal 2 is not easily deformed.

10. The contact arm 211 is provided with two side surfaces N parallel to each other, such that the area of the elastic arm 21 at the location of the connecting arm 211 is increased, thus enhancing the strength of the elastic arm 21, and increasing the shielding area of the conductive terminal 2 for grounding to the adjacent conductive terminal 2 for transmitting signals.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A conductive terminal, comprising:

a base portion, wherein the base portion is a flat plate structure; and an elastic arm formed by extending upward from an upper end of the base portion, wherein the elastic arm comprises a contact arm, a first arm and a second arm provided at an interval in a left-right direction, and a through slot formed between the first arm and the second arm, the through slot extends to the base portion, the first arm and the second arm are connected to the base portion, the first arm and the second arm are both located between the contact arm and the base portion, the contact arm has a contact portion, a maximum width of the second arm in the left-right direction is greater than a maximum width of the first arm in the left-right direction, a width of a connecting location of the second arm and the base portion in the left-right direction is greater than a width of a connecting location of the first arm and the base portion in the left-right direction, and a central line of the contact portion in the left-right direction and the connecting location of the second arm and the base portion are located at a left side and a right side of a central line of the base portion in the left-right direction.

2. The conductive terminal according to claim 1, wherein a length of a conductive path from the contact portion through the first arm to a connecting location of the first arm and the base portion is shorter than a length of a conductive path from the contact portion through the second arm to the connecting location of the second arm and the base portion.

3. The conductive terminal according to claim 1, wherein the conductive terminal has a conductive portion and a connecting arm, the conductive portion is located below the base portion, the connecting arm is connected to the conductive portion and the base portion, and a central line of the conductive portion in the left-right direction and the central line of the contact portion in the left-right direction are located at a same side of the central line of the base portion in the left-right direction.

4. The conductive terminal according to claim 3, wherein a length of a shortest conductive path from the contact portion to the conductive portion through the second arm is longer than a length of a shortest conductive path from the contact portion to the conductive portion through the first arm.

5. The conductive terminal according to claim 1, wherein the through slot extends to the upper end of the base portion, and a width of a connecting location of the first arm and the contact arm in the left-right direction is equal to a width of the connecting location of the second arm and the contact arm in the left-right direction.

6. The conductive terminal according to claim 1, wherein the conductive terminal has a conductive portion, a connecting arm and a through hole running through the base portion, the conductive portion functions as a soldering portion and is located below the base portion, the connecting arm is connected to the conductive portion and the base portion, the through hole comprises a wide portion and a narrow portion, the wide portion is located below the narrow portion and is in communication with the narrow portion, the base portion has a first protruding bump formed by protruding upward relative to a bottom portion of the wide portion, and the connecting arm is connected to the base portion correspondingly below the first protruding bump.

7. The conductive terminal according to claim 6, wherein the base portion further has a second protruding bump and two first curve surfaces formed on a top portion of the narrow portion, the second protruding bump is formed by protruding downward from the top portion of the narrow portion, each of the first curve surfaces arches upward, the second protruding bump has a second curve surface arching downward, and the two first curve surfaces are respectively located at a left side and a right side of the second protruding bump and are connected to the second curve surface.

8. The conductive terminal according to claim 6, wherein the base portion further has a second protruding bump, the second protruding bump protrudes downward relative to the top portion of the narrow portion, the first protruding bump is located below the second protruding bump and is spaced apart from the first protruding bump, and the central line of the contact portion in the left-right direction passes through the first protruding bump and the second protruding bump in a vertical direction.

9. The conductive terminal according to claim 6, wherein the base portion has two first branches and two second branches, the two second branches are connected to each other, the two first branches are formed at a left side and a right side of the narrow portion, the two second branches are provided corresponding to the wide portion, each of the two second branches is connected to one of the two first branches, a size of each of the second branches located at a left side and a right side of the wide portion in the left-right direction is not greater than one half of a size of each of the first branches in the left-right direction, and a size of the second branch located below the wide portion in a vertical direction is not greater than one half of a size of each of the first branches in the left-right direction.

10. The conductive terminal according to claim 1, wherein the conductive terminal has a through hole running through the base portion, the through hole comprises a wide portion and a narrow portion, the wide portion is located below the narrow portion and is in communication with the narrow portion, the conductive terminal is provided with at least two protrusions at the left side and the right side of the base portion, respectively, each of the protrusions is formed by protruding toward a side away from the through hole from the base portion in the left-right direction, the protrusions located at two sides of the narrow portion are defined as first protrusions, the protrusions located at two sides of the wide portion are defined as second protrusions, and the first protrusions are located above the second protrusions and are spaced apart from the second protrusions.

11. The conductive terminal according to claim 1, wherein the conductive terminal has a through hole running through the base portion, the through hole comprises a wide portion and a narrow portion, the wide portion is located below the narrow portion and is in communication with the narrow portion, the base portion has two oblique surfaces formed on a top portion of the wide portion, and the two oblique surfaces are located at a left side and a right side of the narrow portion and extend obliquely downward and toward each other.

12. The conductive terminal according to claim 1, wherein the contact arm further comprises a widening portion connected to the contact portion, a minimum size of the widening portion in the left-right direction is greater than a maximum size of the contact portion in the left-right direction, at least portions of the first arm and the second arm extend obliquely upward to be closer to each other and are connected to the widening portion, the widening portion has two side surfaces provided opposite to each other along the left-right direction, and the two side surfaces are parallel to each other.

13. A conductive terminal, comprising:

a base portion, wherein the base portion is a flat plate structure;

an elastic arm formed by extending upward from an upper end of the base portion; and a conductive portion located below the base portion, wherein the elastic arm comprises a contact arm, a first arm and a second arm provided at an interval in a left-right direction, and a through slot formed between the first arm and the second arm, the through slot extends to the base portion, the first arm and the second arm are connected to the base portion, the first arm and the second arm are both located between the contact arm and the base portion, the contact arm has a contact portion, a maximum width of the second arm in the left-right direction is greater than a maximum width of the first arm in the left-right direction, a width of a connecting location of the second arm and the base portion in the left-right direction is greater than a width of a connecting location of the first arm and the base portion in the left-right direction, and a length of a shortest conductive path from the contact portion to the conductive portion through the first arm is shorter than a length of a shortest conductive path from the contact portion to the conductive portion through the second arm.

14. The conductive terminal according to claim 13, wherein a central line of the contact portion in the left-right direction and a connecting location of the second arm and the base portion are located at a left side and a right side of a central line of the base portion in the left-right direction.

15. The conductive terminal according to claim 13, wherein the conductive terminal has a conductive portion and a connecting arm, the conductive portion functions as a soldering portion and is located below the base portion, the connecting arm is connected to the conductive portion and the base portion, and a central line of the conductive portion in the left-right direction and the central line of the contact portion in the left-right direction are located at a same side of the central line of the base portion in the left-right direction.

16. An electrical connector, comprising:

an insulating body, having an upper surface and a lower surface provided opposite to each other along a vertical direction; and a plurality of conductive terminals, provided in the insulating body, wherein each of the conductive terminals has a base portion and an elastic arm formed by extending upward from an upper end of the base portion, and the base portion is a flat plate structure, wherein the elastic arm comprises a contact arm, a first arm and a second arm provided at an interval in a left-right direction, and a through slot formed between the first arm and the second arm, the through slot extends to the base portion, the first arm and the second arm are connected to the base portion, the first arm and the second arm are both located between the contact arm and the base portion, the contact arm has a contact portion, a maximum width of the second arm in the left-right direction is greater than a maximum width of the first arm in the left-right direction, a width of a connecting location of the second arm and the base portion in the left-right direction is greater than a width of a connecting location of the first arm and the base portion in the left-right direction, and a central line of the contact portion in the left-right direction and the connecting location of the second arm and the base portion are located at a left side and a right side of a central line of the base portion in the left-right direction.

17. The electrical connector according to claim 16, wherein the conductive terminal has a conductive portion and a connecting arm, the conductive portion functions as a soldering portion and is located below the base portion, the connecting arm is connected to the conductive portion and the base portion, along the left-right direction, a central line of the conductive portion in the left-right direction and the central line of the contact portion in the left-right direction are located at a same side of the central line of the base portion in the left-right direction, the first arm and the second arm are connected to the base portion, and a length of a shortest conductive path from the contact portion to the conductive portion through the second arm is longer than a length of a shortest conductive path from the contact portion to the conductive portion through the first arm.

* * * * *